United States Patent
Li et al.

(10) Patent No.: US 11,844,065 B2
(45) Date of Patent: Dec. 12, 2023

(54) SIDELINK DISCONTINUOUS RECEPTION (DRX) OPERATIONS

(71) Applicant: QUALCOMM Incorporated, San Diego, CA (US)

(72) Inventors: Qing Li, Princeton Junction, NJ (US); Ozcan Ozturk, San Diego, CA (US); Kapil Gulati, Belle Mead, NJ (US); Hong Cheng, Basking Ridge, NJ (US); Gavin Bernard Horn, La Jolla, CA (US); Dan Vassilovski, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 143 days.

(21) Appl. No.: 17/447,026

(22) Filed: Sep. 7, 2021

(65) Prior Publication Data

US 2022/0095326 A1  Mar. 24, 2022

Related U.S. Application Data

(60) Provisional application No. 63/082,797, filed on Sep. 24, 2020.

(51) Int. Cl.
*H04W 72/1263* (2023.01)
*H04L 1/1867* (2023.01)
(Continued)

(52) U.S. Cl.
CPC ....... *H04W 72/1263* (2013.01); *H04L 1/1819* (2013.01); *H04L 1/1896* (2013.01);
(Continued)

(58) Field of Classification Search
CPC ......... H04W 72/1263; H04W 52/0232; H04W 72/0446; H04W 72/20; H04W 76/14;
(Continued)

(56) References Cited

U.S. PATENT DOCUMENTS

| 2020/0228247 A1 | 7/2020 | Guo et al. |
| 2023/0014303 A1* | 1/2023 | Di Girolamo ........ H04W 72/20 |

FOREIGN PATENT DOCUMENTS

| WO | 2018064477 A1 | 4/2018 |
| WO | WO-2022015015 A1 * | 1/2022 |
| WO | WO-2022053627 A1 * | 3/2022 |

OTHER PUBLICATIONS

Ericsson: "Remaining Aspects of SL DRX", 3GPP Draft, R2-2107472, 3GPP TSG-RAN WG2 #115-e, 3rd Generation Partnership Project (3GPP), Mobile Competence Centre, 650, Route Des Lucioles, F-06921 Sophia-Antipolis Cedex, France, vol. RAN WG2, no. Electronic meeting, Aug. 16, 2021, Aug. 5, 2021 (Aug. 5, 2021), XP052032310, pp. 1-13, Retrieved from the Internet: URL:https://ftp.3gpp.org/tsg_ran/WG2_RL2/TSGR2_115-e/Docs/R2-2107472.zip, R2-2107472—Remaining aspects of SL DRX.docx [retrieved on Aug. 5, 2021] the Whole Document.

(Continued)

*Primary Examiner* — Rina C Pancholi
(74) *Attorney, Agent, or Firm* — Patterson + Sheridan, LLP

(57) ABSTRACT

Certain aspects provide a method for wireless communication by a user equipment (UE). The method generally includes determining a configuration associated with sidelink for at least one communication; monitoring for at least one SCI after entering a sidelink discontinuous reception (DRX) on phase based on the configuration; receiving, from one or more other UEs, the at least one SCI during the sidelink DRX on phase for at least one communication; and determining an extension to the sidelink DRX on phase based on the at least one SCI scheduling at least one first resource for one or more transmissions.

28 Claims, 16 Drawing Sheets

(51) Int. Cl.
    *H04W 52/02*     (2009.01)
    *H04L 1/1812*     (2023.01)
    *H04W 72/0446*     (2023.01)
    *H04W 72/20*     (2023.01)

(52) U.S. Cl.
    CPC ... *H04W 52/0232* (2013.01); *H04W 72/0446* (2013.01); *H04W 72/20* (2023.01)

(58) Field of Classification Search
    CPC ............... H04W 84/005; H04W 92/18; H04W 52/0229; H04W 76/28; H04W 52/0216; H04L 1/1819; H04L 1/1896; H04L 1/1883; Y02D 30/70
    See application file for complete search history.

(56) References Cited

OTHER PUBLICATIONS

Huawei, et al., "Physical Layer Impacts of Sidelink DRX", 3GPP Draft, R1-2006402, 3GPP TSG RAN WG1 #102-e, 3rd Generation Partnership Project (3GPP), Mobile Competence Centre, 650, Route Des Lucioles, F-06921 Sophia-Antipolis Cedex, France, vol. RAN WG1, no. E-meeting, Aug. 17, 2020-Aug. 28, 2020, Aug. 8, 2020 (Aug. 8, 2020), XP051918014, 4 Pages, Retrieved from the Internet: URL:https://ftp.3gpp.org/tsg_ran/WG1_RL1/TSGR1_102-e/Docs/R1-2006402.zip R1-2006402.docx [retrieved on Aug. 8, 2020] p. 2-p. 3.
Partial International Search Report—PCT/US2021/071390—ISA/EPO—dated Dec. 21, 2021.
International Search Report and Written Opinion—PCT/US2021/071390—ISA/EPO—dated Feb. 11, 2022.

* cited by examiner

SIDELINK DISCONTINUOUS RECEPTION (DRX) OPERATIONS

CROSS-REFERENCE TO RELATED APPLICATION

This application claims benefit of and priority to U.S. Provisional Application No. 63/082,797 filed Sep. 24, 2020, which is hereby expressly incorporated by reference herein in its entirety as if fully set forth below and for all applicable purposes.

INTRODUCTION

Aspects of the present disclosure relate to wireless communications, and more particularly, to techniques for sidelink communication.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved sidelink communication.

Certain aspects provide a method for wireless communication by a user equipment (UE). The method generally includes determining one or more sidelink discontinuous reception (DRX) configurations or wake-up indication configurations if enabled, for at least one communication; monitoring for at least one sidelink control information (SCI) after entering a sidelink DRX on phase based on the one or more sidelink DRX configurations or one or more wake-up indications detected; receiving, from one or more other UEs, the at least one SCI during the sidelink DRX on phase for at least one communication; and determining an extension to the sidelink DRX on phase based on whether the at least one SCI schedules at least one first resource for one or more transmissions after the sidelink DRX on phase for at least one communication.

Certain aspects provide a method for wireless communication by a UE. The method generally includes determining one or more sidelink DRX configurations or one or more wake-up indication configurations if enabled, for at least one communication; determining an extension to a sidelink DRX on phase associated with the one or more sidelink DRX configurations or one or more wake-up indications based on whether at least one SCI schedules at least one first resource for one or more transmissions after the sidelink DRX on phase for at least one communication; and transmitting the wake-up indication if enabled prior to the sidelink DRX on phase if enabled and transmitting the at least one SCI during the sidelink DRX on phase to at least one other UE for at least one communication.

Certain aspects provide a method for wireless communication by a UE. The method generally includes: determining a configuration associated with sidelink for at least one communication; monitoring for at least one SCI after entering a sidelink DRX on phase based on the configuration; receiving, from one or more other UEs, the at least one SCI during the sidelink DRX on phase for at least one communication; and determining an extension to the sidelink DRX on phase based on the at least one SCI scheduling at least one first resource for one or more transmissions.

Certain aspects provide a method for wireless communication by a UE. The method generally includes: determining a configuration associated with sidelink for at least one communication; determining an extension to a sidelink DRX on phase associated with the configuration based on at least one SCI scheduling at least one first resource for one or more transmissions; and transmitting the at least one SCI during the sidelink DRX on phase to at least one other UE for at least one communication.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

To the accomplishment of the foregoing and related ends, the one or more aspects comprise the features hereinafter fully described and particularly pointed out in the claims.

The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
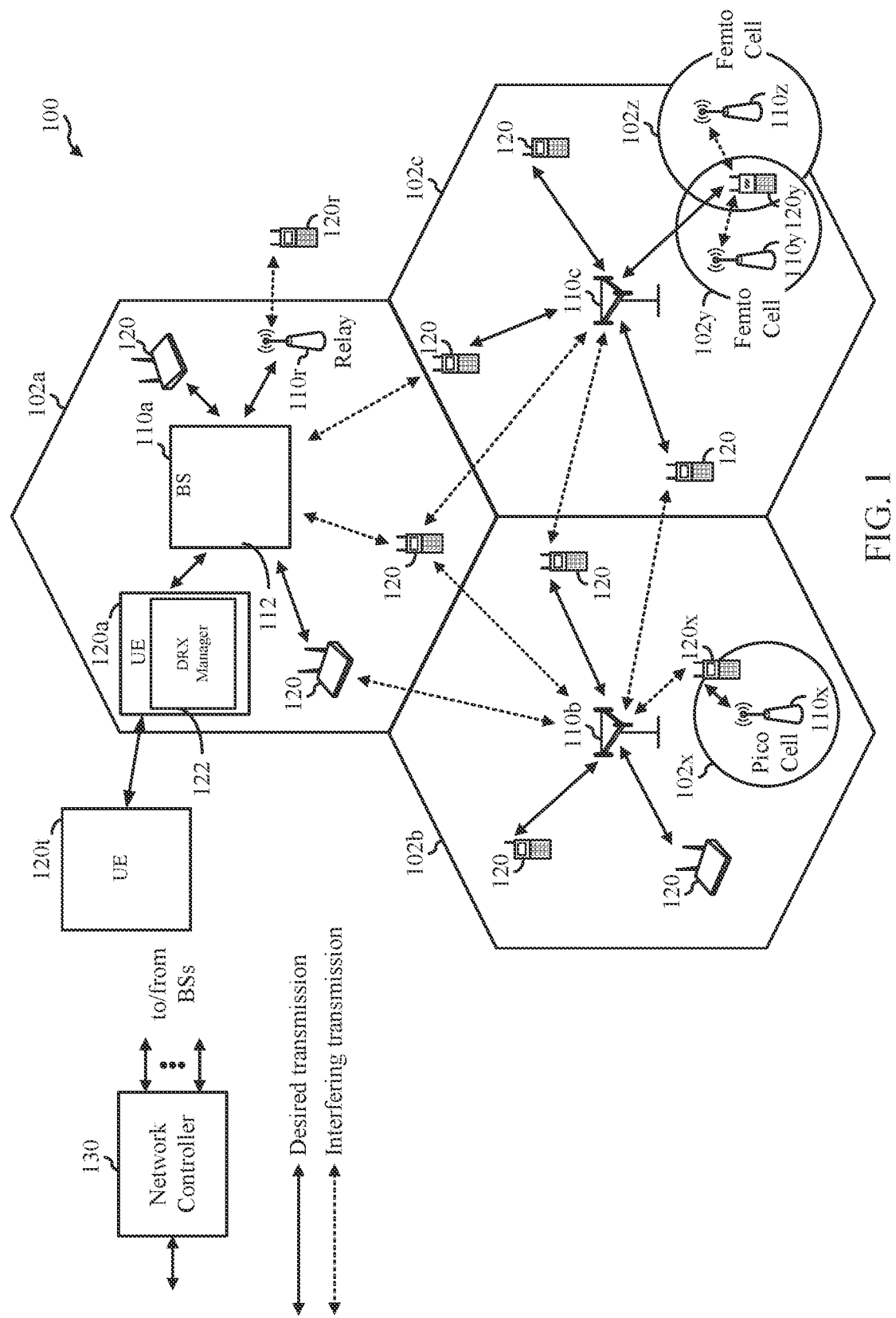
FIG. 1 is a block diagram conceptually illustrating an example telecommunications system, in accordance with certain aspects of the present disclosure.

Aspects of the present disclosure provide apparatus, methods, processing systems, and computer readable mediums for sidelink (SL) discontinuous reception (DRX). For example, certain aspects provide techniques for extending a SL DRX on phase associated with a SL DRX configuration to facilitate retransmissions or monitoring for transmissions in reselected resources. In other words, sidelink control information (SCI) from a transmit (Tx) UE during a DRX on phase may indicate resources after the DRX on phase for retransmission. In response, a receive (Rx) UE may extend the DRX on phase to receive the retransmission.

In some implementations, resources reserved for a transmission during a DRX on phase may be reselected with other resources by the Tx UE. Thus, an Rx UE may stay active to monitor for transmissions using reselected resources. To reduce power consumption, a resource reselection indication (RRI) or preemption indication (PI) may be explicitly or implicitly transmitted by the Tx UE to the Rx UE indicating whether resources reserved for a transmission or retransmission have been reselected or cancelled. Thus, if such the RRI or PI is received by the Rx UE, the Rx UE may enter an inactive state and forgo staying active to monitor for the transmission or retransmission reselected or preempted, reducing power consumption at the Rx UE, as described in more detail herein.

The following description provides examples of configurations for sidelink (SL) communication in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the UEs 120 may be configured for managing sidelink in a discontinuous reception (DRX) mode of operations. As shown in FIG. 1, the UE 120a includes a DRX manager 122. The UE 120a may be a Rx UE in some cases. In this case, the DRX manager 122 may be configured for extending a sidelink DRX during which a transmission may be received, as described in more detail herein. In some cases, the UE 120a may be a Tx UE. In this case, the Tx UE may determine to extend a sidelink DRX during which a transmission may be transmitted.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
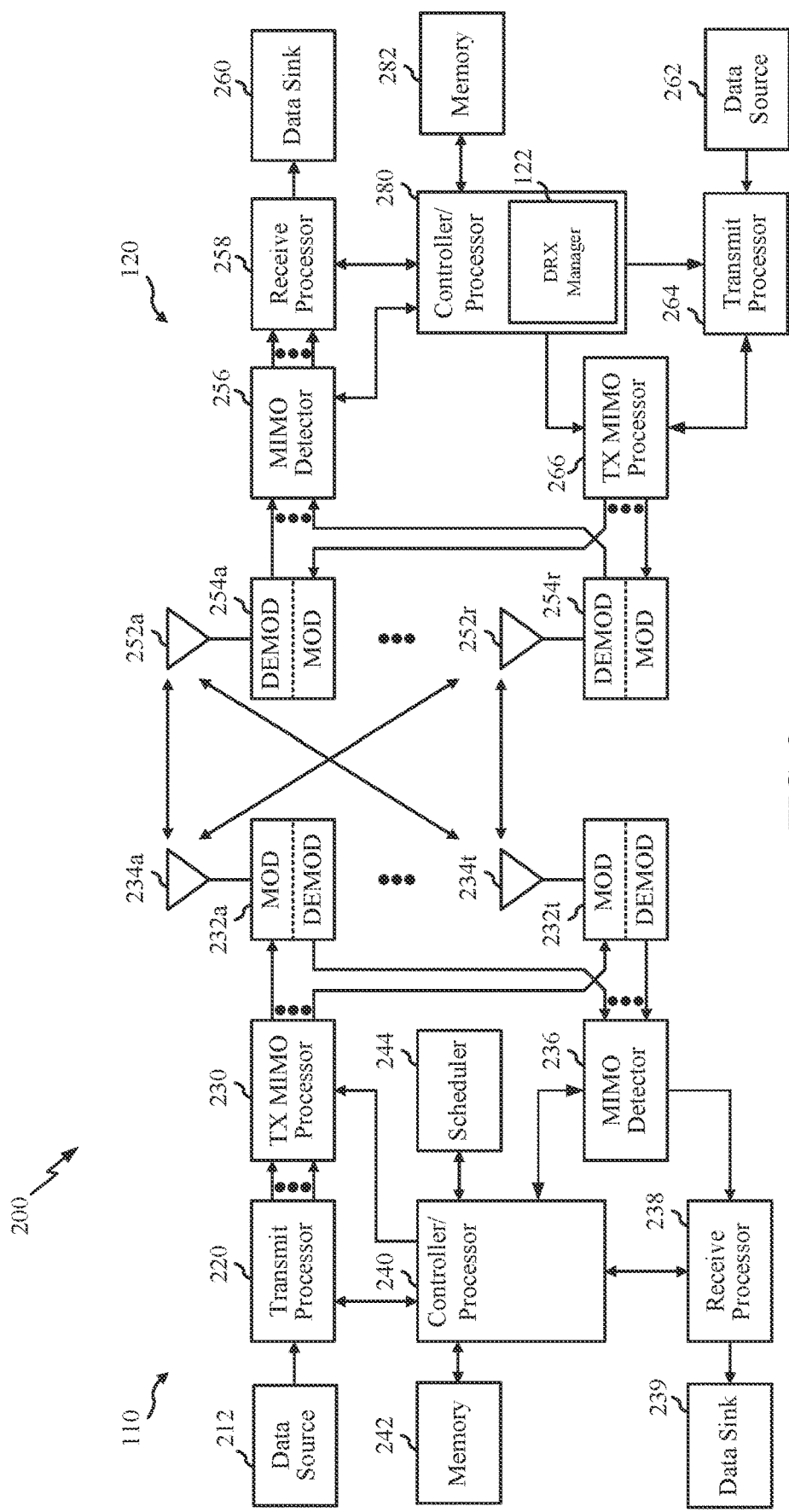
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), and secondary synchronization signal (SSS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, cyclic prefix (CP)-OFDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. As shown in FIG. 2, the controller/processor 280 of the UE 120a has the DRX manager 122. Although shown at the Controller/Processor, other components of the UE 120a may be used performing the operations described herein.

Figure 3B:
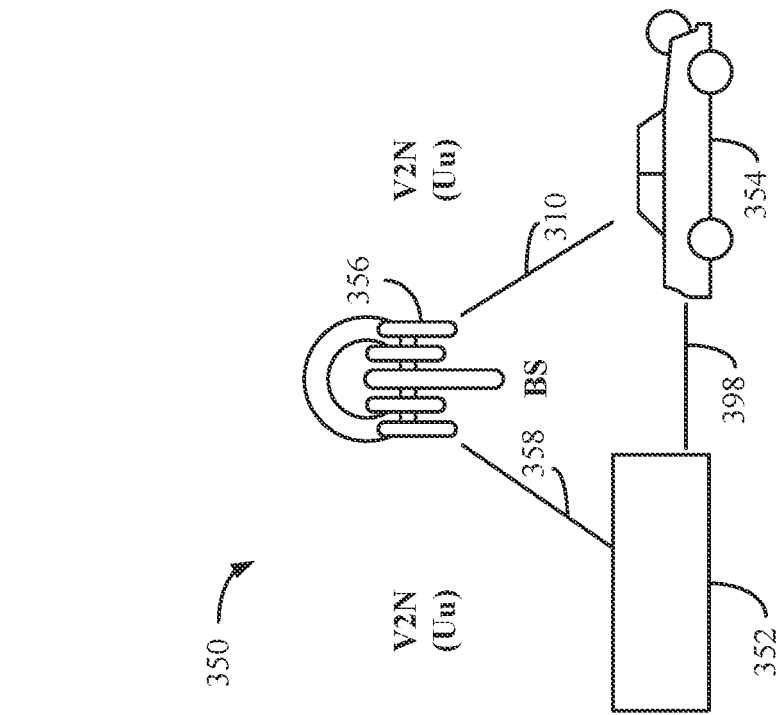
FIGS. 3A and 3B show diagrammatic representations of example vehicle to everything (V2X) systems in accordance with some aspects of the present disclosure.
Figure 3A:
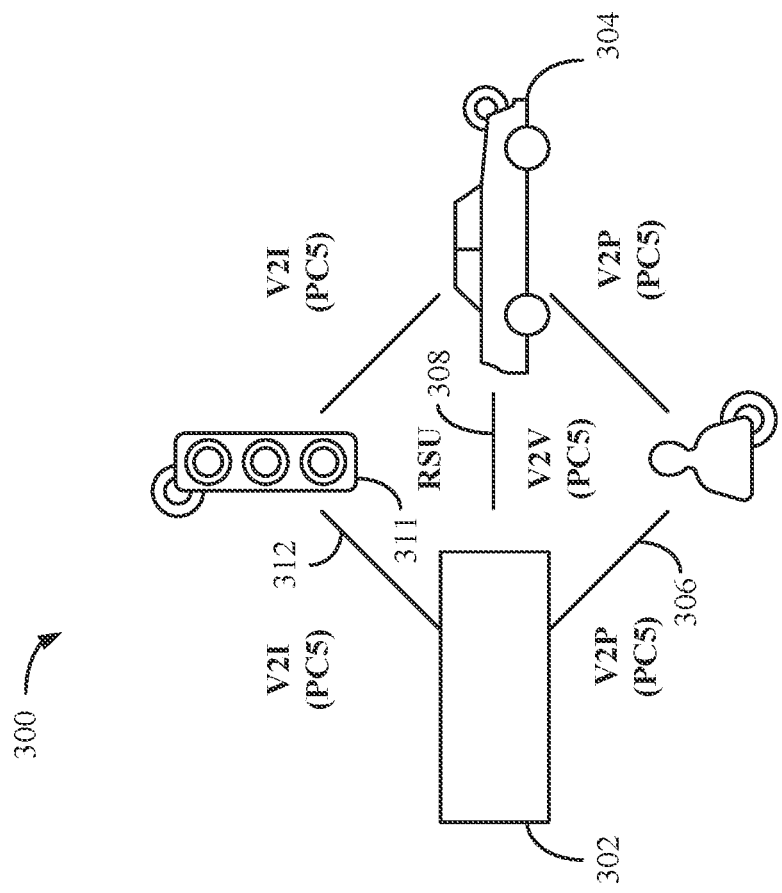

FIGS. 3A and 3B show diagrammatic representations of example vehicle to everything (V2X) systems in accordance with some aspects of the present disclosure. For example, the UEs shown in FIGS. 3A and 3B may communicate via sidelink channels and may perform sidelink CSI reporting as described herein.

The V2X systems, provided in FIGS. 3A and 3B provide two complementary transmission modes. A first transmission mode, shown by way of example in FIG. 3A, involves direct communications (for example, also referred to as side link communications) between participants in proximity to one another in a local area. A second transmission mode, shown by way of example in FIG. 3B, involves network communications through a network, which may be implemented over a Uu interface (for example, a wireless communication interface between a radio access network (RAN) and a UE). As illustrated, UEs 352, 354 may communicate with each other using a sidelink (SL) 398 over a PC5 interface.

Referring to FIG. 3A, a V2X system 300 (for example, including vehicle to vehicle (V2V) communications) is illustrated with two UEs 302, 304 (e.g., vehicles). The first transmission mode allows for direct communication between different participants in a given geographic location. As illustrated, a vehicle can have a wireless communication link 306 with an individual (V2P) (for example, via a UE) through a PC5 interface. Communications between the UEs 302 and 304 may also occur through a PC5 interface 308. In a like manner, communication may occur from a UE 302 to other highway components (for example, roadside unit (RSU) 311), such as a traffic signal or sign (V2I) through a PC5 interface 312. With respect to each communication link illustrated in FIG. 3A, two-way communication may take place between elements, therefore each element may be a transmitter and a receiver of information. The V2X system 300 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 3B shows a V2X system 350 for communication between a UE 352 (e.g., vehicle) and a UE 354 (e.g., vehicle) through a network entity 356. These network communications may occur through discrete nodes, such as a base station (for example, an eNB or gNB), that sends and receives information to and from (for example, relays information between) UEs 352, 354. The network communications through vehicle to network (V2N) links (e.g., Uu links 358 and 310) may be used, for example, for long range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

In some circumstances, two or more subordinate entities (for example, UEs) may communicate with each other using sidelink signals. As described above, V2V and V2X communications are examples of communications that may be transmitted via a sidelink. Other applications of sidelink communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications. Generally, a sidelink may refer to a direct link between one subordinate entity (for example, UE1) and another subordinate entity (for example, UE2). As such, a sidelink may be used to transmit and receive a communication (also referred to herein as a "sidelink signal") without relaying the communication through a scheduling entity (for example, a BS), even though the scheduling entity may be utilized for scheduling or control purposes. In some examples, a sidelink signal may be communicated using a licensed spectrum (unlike wireless local area networks, which typically use an unlicensed spectrum).

Various sidelink channels may be used for sidelink communications, including a physical sidelink control channel (PSCCH), a physical sidelink shared channel (PSSCH), and a physical sidelink feedback channel (PSFCH). The PSSCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as acknowledgement (ACK) or negative acknowledgement (NACK) for hybrid automatic repeat request HARQ feedback. PSSCH may be used to carry channel state information (CSI) related to a sidelink channel quality.

Discontinuous Reception (DRX) on Sidelink

In a discontinuous reception (DRX) mode of operation, a UE may enter a low power ("sleep") mode (also referred to herein as a "sleep phase"), which may also be referred to as a low power state, for a certain period of time (referred to as a DRX OFF phase, or duration) and wakes up again during a DRX on (e.g., awake phase) duration (also referred to as a DRX on phase) to check if there is any data to be received. The cycle of sleep and wake up (DRX on and DRX off) durations repeats over time, allowing the UE to save power while maintaining communication.

Currently, DRX is not defined for sidelink operations, and thus, a receiver (Rx) UE has to monitor for sidelink control information (SCI) for each time slot, causing high power consumption which is especially detrimental for battery power confined UEs such as pedestrian UEs for Vehicle-to-Person (V2P) service on sidelink or UEs for public safety services on sidelink. Thus, SL DRX design is needed to save power for sidelink communications. As compared with communications between a UE and a base station (BS) on the Uu interface, sidelink communications among different UEs are more diverse. For example, a UE may simultaneously engage in different vehicle-to-everything (V2X) services with different quality of service (QoS) requirements (e.g., reliability, latency, etc.), and different communication types (e.g., broadcast, groupcast and unicast). Therefore, a one-size-fits-all SL DRX design may not be best for both saving power and meeting diverse QoS requirements.

Figure 4:
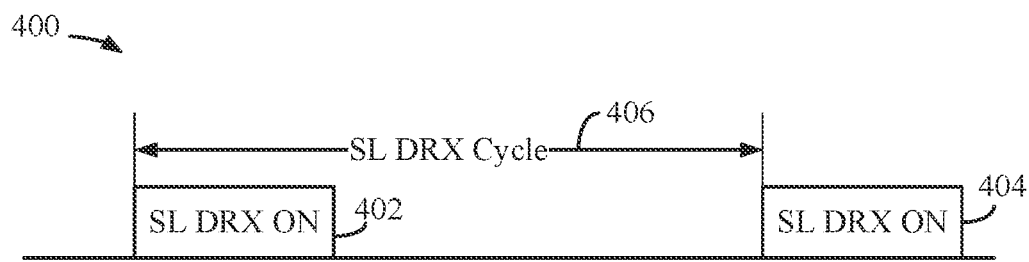
FIG. 4 illustrates an example sidelink discontinuous reception (SL DRX) configuration of a UE, in some aspects.

FIG. 4 illustrates an example SL DRX configuration 400 of a UE. As illustrated, the SL DRX configuration 400 may include SL DRX on phases 402, 404. As described herein, an SL DRX on phase repeats every SL DRX cycle. For example, the SL DRX on phase 402 is during a SL DRX cycle 406, as illustrated. A transmitter (Tx) UE is awake during the SL DRX on phases 402, 404 to communicate with other Rx UE for unicast or Rx UEs for broadcast and groupcast, (e.g., Rx UE(s) monitors for signaling that may be received from the Tx UE), and both Tx UE and Rx UE(s) are in a low power state (e.g., sleep phase) at other times (also referred to as SL DRX sleep phase). In addition, a UE of a service, a group, or a UE pair, becomes a Tx UE on sidelink when it has a packet to transmit on sidelink to the other UEs of a service or a group or to the other UE of a UE pair. Hence, differently from the DRX for a UE monitoring downlink control information (DCI) from a base station at Uu interface, SL DRX is bidirectional on sidelink for both Tx UE and Rx UE(s) and therefore an SL DRX forms sidelink traffic patterns for a service, a group or a UE pair.

Example SL DRX Operations

As described herein, a sidelink discontinuous reception (SL DRX) may be formed to assist an Rx UE for unicast, broadcast or groupcast in determining when to monitor for sidelink control information(s) (SCI(s)) from a Tx UE, the SCI scheduling a sidelink transmission to the Rx UE(s). Thus, SL DRX allows the Rx UE(s) to save power by non-contiguously monitoring SCI. As described herein, an SL DRX is bidirectional and also forms the traffic pattern for a Tx UE. In other words, a Tx UE may not transmit while Rx UE(s) is not in an SL DRX on state for monitoring SCI(s). In other words, if the Rx UE(s) is not in a DRX on phase, the Rx UE may be in a sleep mode of operation and may not monitor for SCIs. Thus, a Tx UE may also forgo transmissions to other UEs that are not in a DRX on phase.

If different SL DRXs are formed for different communications types, a UE participating in different sidelink communication types may wake up to monitor SCI for each sidelink DRX on phase based on one or multiple DL DRX configurations or based on one or multiple wake-up indications detected prior to an SL DRX on phase. These communication types may include a communication among all UEs with an application or service using broadcast, a communication among UEs within a group using groupcast, and/or a communication between a UE pair using unicast. Therefore, an Rx UE may monitor SCI(s) from one or multiple Tx UEs for one or multiple communications of an application or service, a group, or a UE pair for each sidelink DRX on phase based on one or multiple DL DRX configurations or based on one or multiple wake-up indications detected prior to an SL DRX on phase. For example, multiple Tx UEs may send data to other UEs for a public safety service in broadcast or for a conference meeting within a group in groupcast within an SL DRX on phase. For another example, UEs of a group, e.g., a vehicle platoon, may send unicast to each other, groupcast to the others in the group and broadcast to the UEs in proximity within an SL DRX on phase.

As compared to downlink and uplink scheduling carried on downlink control information (DCI) sent from a base station on the Uu interface, sidelink scheduling carried on SCI from a transmit (Tx) UE on sidelink differs in several ways. For example, no time gap may exist between a scheduling SCI (e.g., a first stage SCI) and data packet carried on a physical sidelink shared channel (PSSCH) associated with the scheduling SCI. In contrast, a time gap may exist between a DCI and the data transmission (e.g., uplink or downlink) scheduled by the DCI. For example, while the DCI may be within a DRX on phase, the scheduled transmission carried on physical downlink shared channel (PDSCH) or physical uplink shared channel (PUSCH) may be after the DRX on phase. However, for sidelink, by the time an SCI is received, the transmission including the data in the PSSCH associated with the SCI are received together. Moreover, the scheduling SCI may contain up to 3 resources for transmission and/or retransmission(s). The scheduling SCI may reserve a resource for transmitting or retransmitting a data packet of a periodic or aperiodic traffic. Based on the afore mentioned differences, certain aspects of the present disclosure provide techniques for configuring an SL DRX on phase in a manner that reduces power consumption of UEs. For example, certain aspects provide techniques for extending SL DRX on phase for a single transmission, and improving power saving based on reserved resources for retransmission(s).

Figure 5:
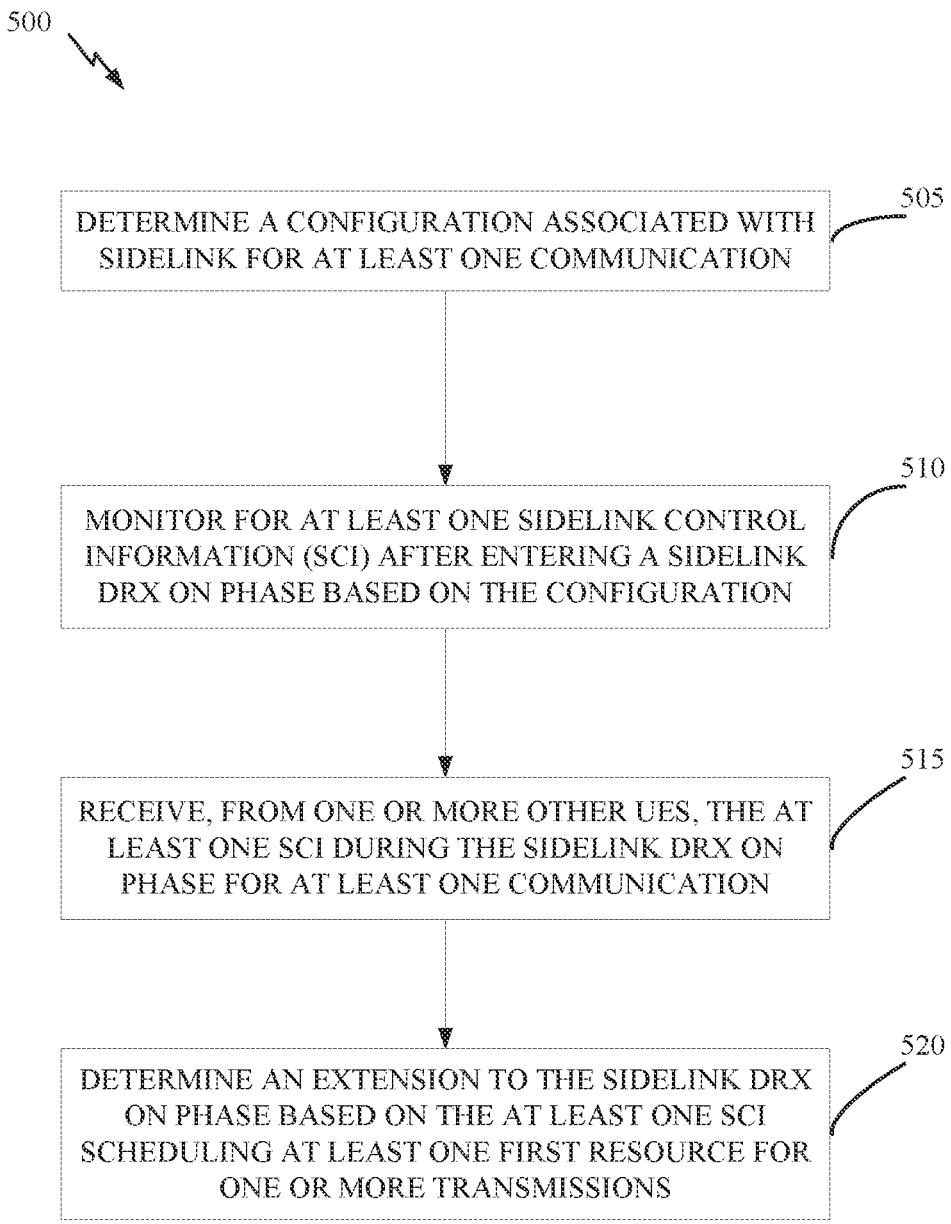
FIG. 5 is a flow diagram illustrating example operations for wireless communication, in accordance with certain aspects of the present disclosure.

FIG. 5 is a flow diagram illustrating example operations 500 for wireless communication, in accordance with certain aspects of the present disclosure. The operations 500 may be performed, for example, by a UE (e.g., such as a UE 120a in the wireless communication network 100, or a UE 120t out of the wireless communication network 100), such as a Rx UE. A Rx UE generally refers to a UE receiving during a DRX on phase.

Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 may begin, at block 505, with the UE determining a configuration associated with sidelink (e.g., one or more sidelink DRX configurations and/or wake-up indication configurations if enabled) for at least one communication. At block 510, the UE monitors for at least one SCI after entering a sidelink DRX on phase based on the configuration. At block 515, the UE receives, from one or more other UEs, the at least one SCI during the sidelink DRX on phase for at least one communication. For example, the at least one SCI may schedule the one or more transmissions across multiple slots, with at least one of the multiple slots being during the sidelink DRX on phase for one or more communications. At block 520, the UE determines an extension to the sidelink DRX on phase based on the at least one SCI scheduling at least one first resource for one or more transmissions. For example, the UE may determine to stay at an active state based on the at least one SCI scheduling the at least one first resource for the one or more transmissions (e.g., based on whether the at least one first resource is after the sidelink DRX on phase). In some cases, the UE receives the one or more transmissions during the extension of the sidelink DRX on phase.

Figure 6:
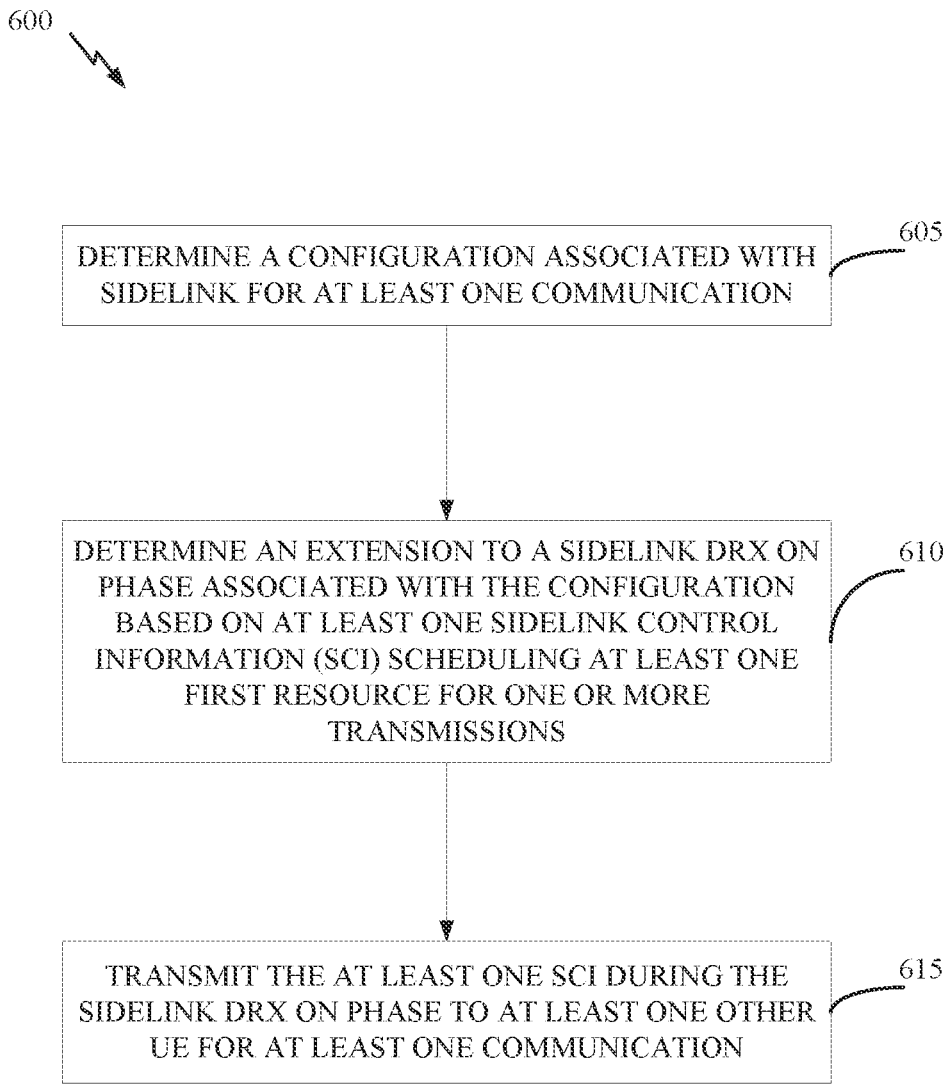
FIG. 6 is a flow diagram illustrating example operations for wireless communication, in accordance with certain aspects of the present disclosure.

FIG. 6 is a flow diagram illustrating example operations 600 for wireless communication, in accordance with certain aspects of the present disclosure. The operations 600 may be understood to be complementary to the operations 500 of FIG. 5. The operations 600 may be performed, for example, by a UE (e.g., such as a UE 120a in the wireless communication network 100, or a UE 120t out of the wireless communication network 100), such as a Tx UE. A Tx UE generally refers to a UE transmitting during a DRX on phase.

Operations 600 may be implemented as software components that are executed and run on one or more processors (e.g., controller/processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 600 may begin, at block 605, with the UE determines a configuration associated with sidelink (e.g., one or more sidelink DRX configurations and/or one or more wake-up indication configurations if enabled) for at least one communication. At block 610, the UE determines an extension to a sidelink DRX on phase associated with the configuration based on whether at least one SCI schedules at least one first resource for one or more transmissions. At block 615, the UE transmits the at least one SCI during the sidelink DRX on phase to other UE(s) for at least one communication. In some cases, the UE also transmits a wake-up indication if enabled prior to the sidelink DRX on phase. The at least one SCI may schedule the one or more transmissions across multiple slots, at least one of the multiple slots being during the sidelink DRX on phase.

Figure 7A:
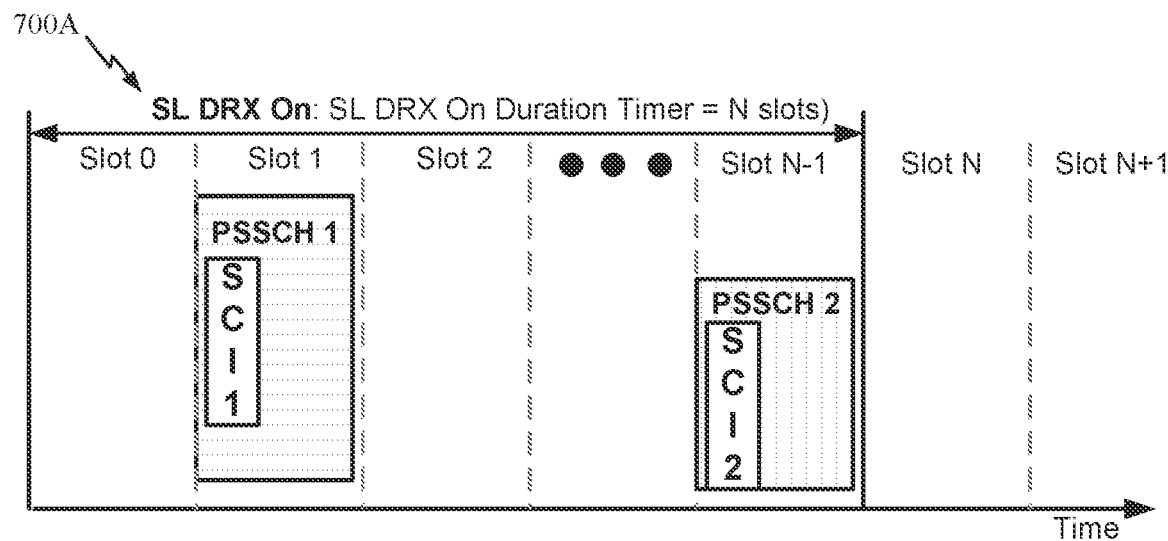
FIGS. 7A, 7B and 7C illustrate implementations of SL DRX with inactivity timer implementations, in accordance with certain aspects of the present disclosure.
Figure 7B:
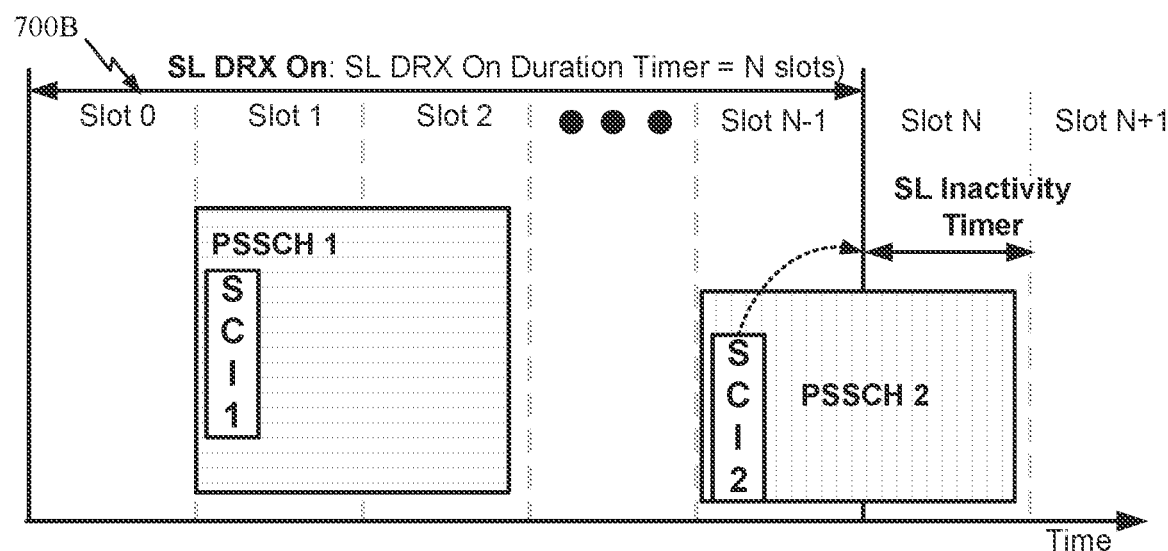
Figure 7C:
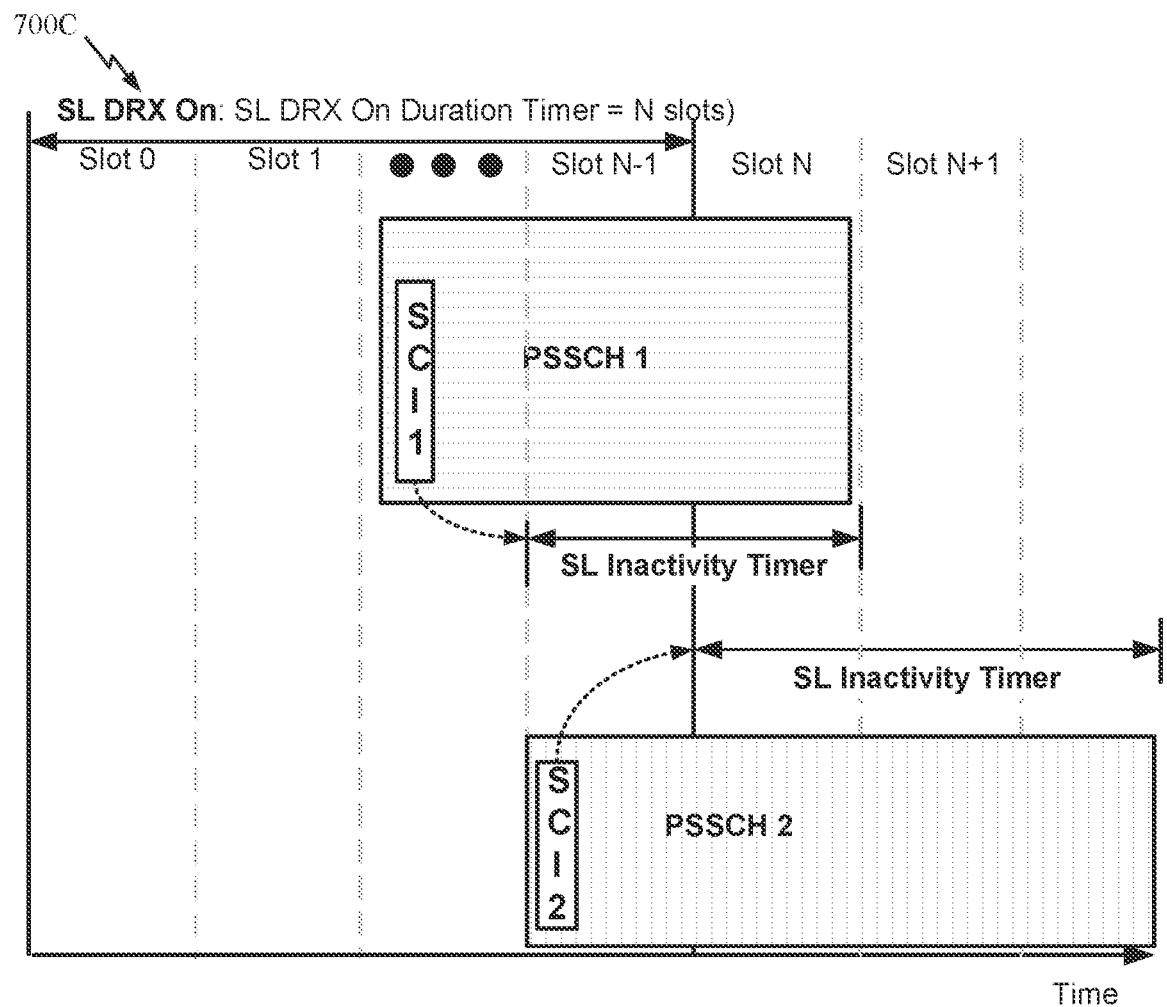

FIGS. 7A, 7B and 7C illustrate implementations 700A, 700B and 700C of SL DRX on phase, in accordance with certain aspects of the present disclosure. As described, for sidelink scheduling, there may be no time gap between a scheduling SCI (e.g., an SCI or a first stage SCI, such as SCI1 or SCI2 as illustrated in FIG. 7A) and a data packet carried on a physical sidelink shared channel (PSSCH) (e.g., PSSCH1 or PSSCH 2 as illustrated in FIG. 7A) associated with the scheduling SCI for a single transmission. In certain aspects of the present disclosure, a SL DRX on phase may be extended for aggregated slot scheduling. In some aspects, SL DRX on phase may not be extended for a single slot-based scheduling since a single slot-based transmission may be finished by end of the SL DRX on phase.

For example, as shown in the implementation 700A of FIG. 7A, SCI1 may be transmitted within PSSCH 1, and SCI2 may be transmitted within PSSCH 2. For slot-based scheduling, as shown in FIG. 7A, the SL DRX on phase (e.g., spanning N slots) may not be extended. For example, an SL Inactivity Timer may be set to a value of 0 at the first slot after the slot receiving a single slot based scheduling SCI. A SL Inactivity Timer generally refers to a timer that may be set by the UE to extend a SL DRX on phase for staying at the active state. After receiving an aggregated slot based scheduling SCI, the SL Inactivity Timer may be set to a duration of one or more slots based on the aggregated slot scheduling. The UE may stay active until the SL Inactivity Timer expires (e.g., UE goes inactive upon expiration of the SL Inactivity Timer). Thus, for slot-based scheduling as illustrated in FIG. 7A, an Rx UE may enter an inactive state to save power after decoding one or more data packets carried on a PSSCH (e.g., PSSCH1 and PSSCH 2) if the PSSCH is a single transmission without HARQ feedback based retransmissions or blind retransmissions (e.g., retransmissions without feedback), as indicated by the scheduling SCI, and no other SCI(s) to be detected for extending the active state per the one or more SL DRX configurations or one or more wake-up indications detected prior to the SL DRX on phase if enabled (e.g., via configuration).

Regarding the implementation 700B of FIG. 7B, for aggregated slot scheduling (e.g., a transmission scheduled across a slot boundary) the SL DRX on phase may be extended by setting the SL Inactivity Timer value, at the first slot after the slot receiving an aggregated slot scheduling SCI, according to the resource(s) indicated in the scheduling SCI for the indicated aggregated slot transmission. In other words, in the case shown in FIG. 7B, the SL Inactivity Timer may be set to a one slot extension, at the first slot after the slot receiving SCI2, for the SL DRX on phase for the data packet carried on PSSCH 2 scheduled by SCI 2. Thus, the SL DRX on phase for the Rx UE may be extended to be longer than N slots, for example, based on the time resources used by that PSSCH as indicated by SCI. Further, the Rx UE may go to an inactive state to save power after SL Inactivity Timer expires. In this case, the Rx UE may do so after slot N (instead of slot N−1) if the transmission is a single transmission without HARQ feedback based retransmissions or blind retransmissions (e.g., retransmissions without feedback), as indicated by the scheduling SCI (e.g., SCI2), and if no other SCI(s) to be detected for extending the active state per the one or more SL DRX configurations or one or more wake-up indications detected prior to the SL DRX on phase if enabled (e.g., via configuration).

Since an Rx UE may monitor SCIs from different Tx UEs for a communication of an application or service, a group or a UE pair or may monitor SCIs from same or different Tx UEs for more than one communication of an application(s) or service(s), a group(s), a UE pair(s), or combination of any within an SL DRX on phase, the SL Inactivity Timer may be set according each SCI detected by the Rx UE within the SL DRX on phase. As illustrated in FIG. 7C, the SL Inactivity Timer is first set after decoding a first received SCI (e.g., SCI1) for a transmission (e.g., PSSCH1) (e.g., beginning at the first slot after the slot receiving the first SCI) and the SL Inactivity Timer is further set or updated after decoding a second received SCI (e.g., SCI2) (e.g., beginning at the first slot after the slot receiving the second SCI) for a second transmission (e.g., PSSCH2). The SL Inactivity Timer may be further set or updated till the last SCI decoded (e.g., at the first slot after the slot receiving the last SCI) within the SL DRX on phase or before SL Inactivity Timer expires (e.g., during which the UE is considered to be in an active state). In some aspects, the SL Inactivity timer is reset for each received SCI while the UE is in an active state (e.g., DRX on, inactivity timer is running, or HARQ retransmission timer is running).

FIGS. 8A-8F illustrate implementations 800A, 800B, 800C, 800D, 800E of SL DRX in various (re)transmission schemes, in accordance with certain aspects of the present disclosure. As described above, a scheduling SCI may indicate up to 3 resources for transmission and/or retransmission(s). Certain aspects provide techniques for SL DRX retransmission (e.g., blind retransmission, hybrid automatic repeat request (HARQ) retransmission, or both) to further enhance power saving in SL DRX.

In some cases, the resources for transmission and/or retransmission(s) (e.g., blind retransmission(s) or HARQ feedback retransmission(s)) may be dropped, for example, due to channel congestion, priority, preemption, or any other relevant factor, and may thus be re-selected by the Tx UE at a later time. However, without any indication from the Tx UE, the Rx UE(s) may continue monitoring for the scheduling SCI for the next transmission or retransmission reserved via a prior SCI in case a reserved resource is dropped.

In some cases, an Rx UE may monitor SCIs from different Tx UEs for a communication of an application or service, a group or a UE pair or may monitor SCIs from same or different Tx UEs for more than one communication of an application(s) or service(s), a group(s), a UE pair(s), or combination of any within an SL DRX on phase, and the RX UE may continue monitoring SCIs till the last SCI, if known via one or more SL DRX configurations or one or more wake-up indications if enabled (e.g., via configuration), within the SL DRX on phase or continue monitoring SCIs through the whole SL DRX on phase.

Figure 8A:
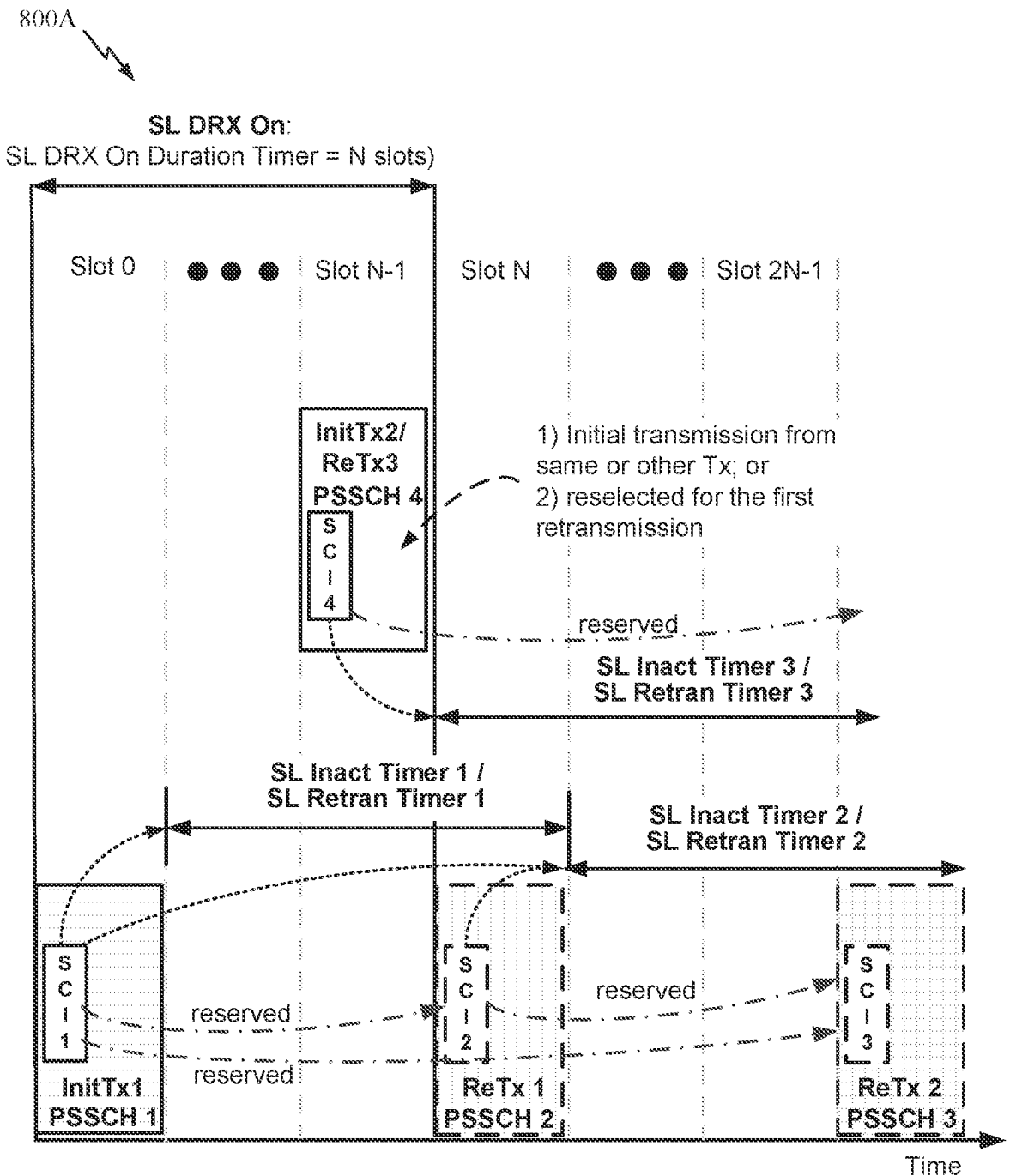
FIGS. 8A-8F illustrate implementations of SL DRX in various (re)transmission schemes, in accordance with certain aspects of the present disclosure.

As illustrated in the implementation 800A of FIG. 8A, a Rx UE may set an SL Inactivity Timer or SL Retransmission Timer based on if monitoring more SCI(s) from the same or different Tx UEs and/or if the decoding of the initial transmission (e.g., Init Tx1 on PS SCH 1) is successful (e.g., no need for retransmission) within the SL DRX on phase. For example, if the initial transmission is successfully decoded, the Rx UE may not monitor any SCI(s) for retransmission(s) and the Rx UE may not monitor any SCI(s) for a new transmission and its associated retransmission(s) from same or different Tx UE(s), for example per one or more SL DRX configuration or per one or more wake-up indications if enabled (e.g., via configuration), the SL Inactivity Timer or SL Retransmission Timer may be set to "0", e.g., no extension to the current SL DRX on phase and the Rx UE may switch to low power mode afterwards if enabled for more power saving (e.g., via configuration or MAC command from Tx UE) or after SL DRX on phase ends (e.g. SL DRX On Duration Timer expires). Otherwise, the Rx UE may keep monitoring any SCI(s) from same or different Tx UE till SL DRX on phase ends (e.g. SL DRX On Duration Timer expires) if no extension to the SL DRX on phase is set; or else, stay active till the extension of the SL DRX on phase (e.g., active state extended by "SL Inact Timer 1" or "SL Retran Timer 1") ends if extended by SCI(s) detected from same or different Tx UE. As used herein, an initial transmission generally refers to the first transmission of a data packet or a transport block (TB).

As another example, a Rx UE may set an SL Inactivity Timer or SL Retransmission Timer based on if monitoring more SCI(s) from same or different Tx UE and/or the first retransmission reserved by the first SCI (e.g., SCI 1) with the initial transmission. Hence, an Rx UE may extend the SL DRX on phase based on the reserved resource as indicated by a first scheduling SCI if it's outside the SL DRX on phase (shown in FIG. 8A) or based on a packet delay budget (PDB) (e.g., a configured value based on PDB) or remaining PDB for the data transmission (not shown in FIG. 8A). For example, if the initial transmission is not successfully decoded, the SL Inactivity Timer or SL Retransmission Timer may be set (e.g., shown as "SL Inact Timer 1" or "SL Retran Timer 1") according to the time between an initial transmission (e.g., InitTx1 carried on PSSCH 1 during slot 0) and at least a first blind retransmission (e.g., ReTx1 carried on PSSCH 2 during slot N which is reserved by SCI 1) where the first blind retransmission is outside of the SL DRX on phase or may be set based on the PDB or remaining PDB after the initial transmission (e.g., InitTx1 carried on PSSCH 1 during slot 0). However, if the first blind retransmission is within the SL DRX on phase, no extension may be applied and the Rx UE stay active for monitoring the first retransmission and any SCI(s) from same or different Tx UE if enabled (e.g., via configuration). If the SL Inactivity Timer or SL Retransmission Timer is set at the first slot after the slot receiving the first SCI (e.g., SCI 1) to extend the SL DRX on phase per the resource(s) reserved for the retransmission(s) by the first SCI or per the remaining PDB of the data to extend the active state to at least the end of the first blind retransmission (e.g., RxTx1 in slot N, facilitating reception of the ReTx1 on PSSCH 2 for the first blind retransmission of InitTx1 reserved by SCI 1) to the end of PDB or remaining PDB of the data respectively, the Rx UE may stay active during this extension for monitoring any resource reselection for at least the first retransmission, for the PDB, or remaining PDB and/or for monitoring any SCI(s) from same or different Tx UE with a new transmission and its associated retransmission(s). If the first retransmission (e.g., ReTx1 on PSSCH 2) is decoded successfully, the Rx UE may switch to low power mode when SL Inactivity Timer or SL Retransmission Timer expires (e.g., the extension of SL DRX on phase ends) based on the first retransmission or before SL Inactivity Timer or SL Retransmission Timer expires based on the PDB or remaining PDB if enabled for more power saving (e.g., via configuration or MAC command). If the first retransmission (e.g., ReTx1 on PSSCH 2) is not decoded successfully, the SL Inactivity Timer or SL Retransmission Timer may be further set or updated if SL Inactivity Timer or SL Retransmission Timer is set per the first retransmissions (e.g., shown as "SL Inact Timer 2" or "SL Retran Timer 2") until at least the end of the second retransmission (e.g., ReTx2 on PSSCH3) as indicated by the first SCI with the initial transmission (e.g., SCI 1) or the second SCI with the first retransmission (e.g., SCI2) or set to the end of the PDB or remaining PDB of the data respectively. The Rx UE may continue staying active during this extension for monitoring any resource reselection for the second retransmission and/or for monitoring any SCI(s) from same or different Tx UE with a new transmission and its associated retransmission(s).

Further, the Rx UE may remain in an active state to check any possible resource reselected for the first blind retransmission originally reserved by the first SCI (e.g., ReTx1 carried on PSSCH 2 reserved by SCI 1) and rescheduled by a third SCI (e.g., ReTx3 carried on PSSCH 4 rescheduled by SCI 4) where the detected third SCI for retransmission before the reserved first retransmission may implicitly indicate a resource reselection due to preemption or dropping or any new transmission and its associated retransmissions from the same or different Tx UE by a third SCI (e.g., InitTx2 carried on PSSCH 4 as scheduled by SCI 4) before the first blind retransmission originally reserved by the first SCI (e.g., ReTx1 on PSSCH2 reserved by SCI 1) (e.g., during the active state extended by SL Inactivity Timer or SL Retransmission Timer), if any. Additionally, if the Rx UE does receive the third scheduling SCI (e.g., SCI 4) prior to the first retransmission originally reserved by the first SCI (e.g., ReTx1 on PSSCH 2), the UE may reset or update the SL Inactivity Timer or SL Retransmission Timer (e.g., shown as "SL Inact Timer 3" or "SL Retran Timer 3") at the first slot after the slot receiving the third scheduling SCI (e.g., SCI 4) based on the resource(s) as indicated by the newly received third scheduling SCI (e.g., SCI 4) and/or the remaining PDB for the data transmission.

Figure 8B:
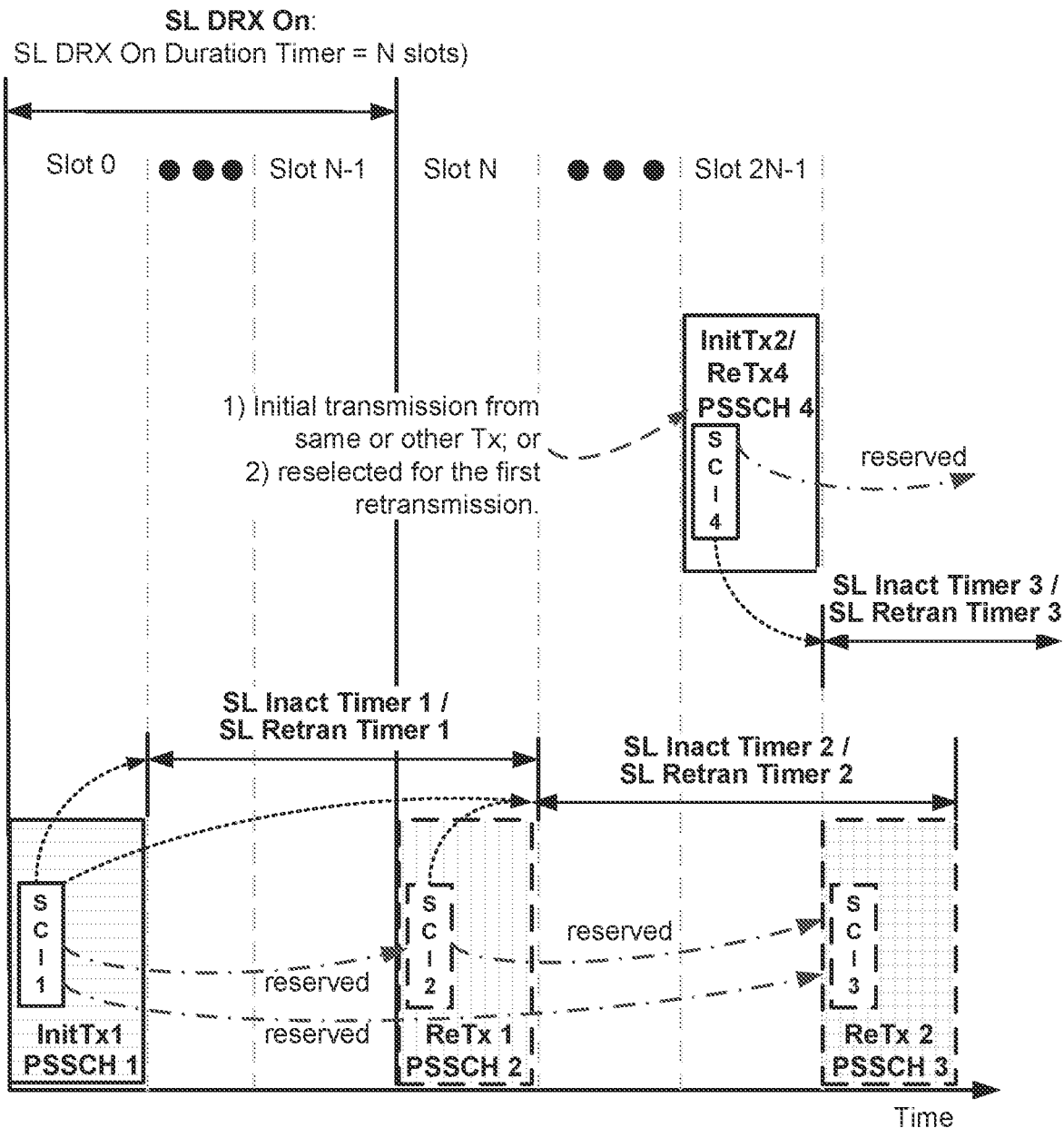

As illustrated in the implementation 800B of FIG. 8B, the Rx UE may remain in an active state to check any possible resource reselected for the first blind retransmission originally reserved by the first SCI (e.g., ReTx1 carried on PSSCH 2 reserved by SCI 1) and rescheduled by a fourth SCI (e.g., ReTx4 carried on PSSCH 4 rescheduled by SCI 4) or any new transmission and its associated retransmissions from same or different Tx UE by a fourth SCI (e.g., InitTx2 carried on PSSCH 4 as scheduled by SCI 4) after the first blind retransmission originally reserved by the first SCI (e.g., ReTx1 on PSSCH2 reserved by SCI 1) is not detected (e.g., the SCI of first retransmission may fail the decoding or the first retransmission may be dropped due to channel congestion, priority, preemption or any other factor, if any). If the first retransmission is not detected (e.g., either SCI 2 or its associated ReTx1 on PSSCH 2 is not detected), the Rx UE may stay active by resetting or updating SL Inactivity Timer or SL Retransmission Timer (e.g., shown as "SL Inact Timer 2" or "SL Retran Timer 2") at the first slot after the slot originally reserved for retransmission, if SL Inactivity Timer or SL Retransmission Timer is set based on the resource for a second retransmission (e.g., ReTx2 on PSSCH 3) as indicated by the first scheduling SCI (e.g., SCI 1) if any, or the Rx UE may keep staying active if SL Inactivity Timer or SL Retransmission Timer is set based on the remaining PDB for the data transmission, to monitor resource reselection for the first retransmission or resource selection for any new transmission and its associated retransmission(s) from same or different Tx UE. During the extension after failed detecting the first retransmission originally reserved by the first SCI (e.g., ReTx1 on PSSCH 2), if the Rx UE does receive a fourth scheduling SCI (e.g., SCI 4) before the second retransmission originally reserved by the first SCI (e.g., ReTx2 on PSSCH 3), the UE may reset or update the SL Inactivity Timer or SL Retransmission Timer (e.g., shown as "SL Inact Timer 3" or "SL Retran Timer 3") at the first slot after the slot receiving the fourth scheduling SCI (e.g., SCI 4), based on the resource(s) as indicated by the newly received fourth scheduling SCI (e.g., SCI 4) and/or based on the PDB or remaining PDB for the data transmission, wherein the fourth scheduling SCI may indicates a resource reselection for the first retransmission (e.g., RxTx4 on PSSCH 4) or a resource selection for a new transmission and its associated retransmission(s) from same or different Tx UE. Otherwise, if no fourth SCI detected for resource reselection, for retransmissions, or for resource selection for a new transmission, the Rx UE may stay active to detect the second retransmission originally reserved by the first SCI (e.g., ReTx2 on PSSCH 3) within the extension (e.g., "SL Inact Timer 2" or "SL Retran Timer 2") based on the reserved resources or based on the PDB or remaining PDB for the data transmission.

Figure 8C:
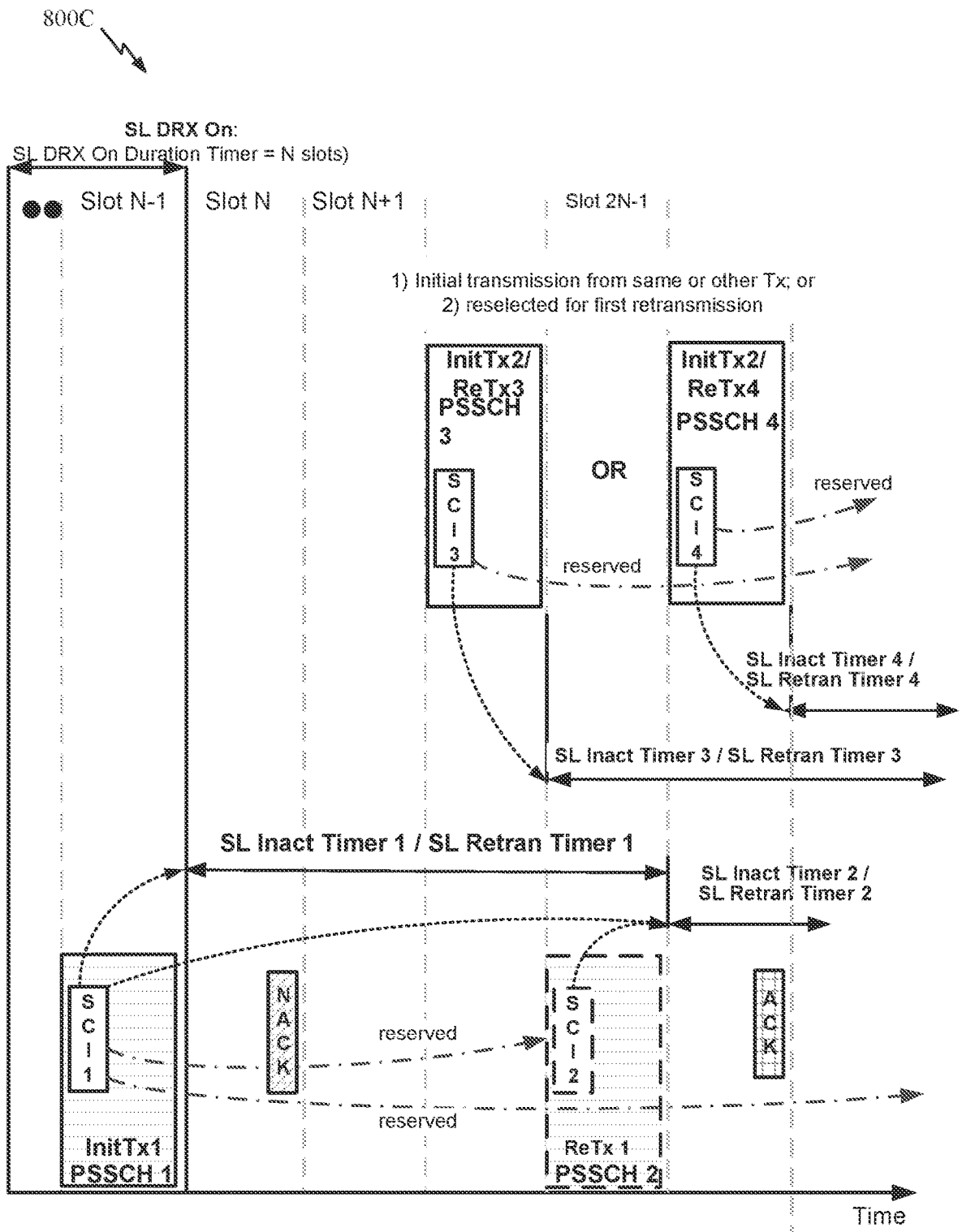

As illustrated in the implementation 800C of FIG. 8C, an Rx UE may set the SL Inactivity Timer or SL Retransmission Timer if monitoring more SCI(s) from same or different Tx UEs and/or the first HARQ feedback resource (e.g., shown as NACK). For example, if the initial transmission is successfully decoded and the HARQ feedback resource is within the SL DRX on phase, the Rx UE may not monitor any SCI(s) for retransmission(s) and the Rx UE may not monitor any SCI(s) for a new transmission and its associated retransmission(s) from same or different Tx UE, for example per one or more SL DRX configuration or per one or more wake-up indications if enabled (e.g., via configuration), the SL Inactivity Timer or SL Retransmission Timer may be set to "0", e.g., no extension to the current SL DRX on phase, the Rx UE may switch to low power mode after sending the ACK if enabled for more power saving (e.g., via configuration or MAC command from Tx UE). Otherwise, the Rx UE may stay active and continue monitoring SCI(s) from the same or other TX UE till SL DRX on phase ends (e.g., SL DRX On Duration Timer expires) if no extension to the SL DRX on phase is set; or else, stay active till the extension of the SL DRX on phase ends if extended by another SCI(s) detected from same or different Tx UE. For another example, if the HARQ feedback resource is allocated outside the SL DRX on phase, the SL Inactivity Timer or SL Retransmission Timer (e.g., "SL Inact Timer 1" or "SL Retran Timer 1") may be set after the slot receiving the first SCI (e.g., SCI1) per the HARQ feedback resource allocation, e.g., extending the SL DRX on phase till at least after the slot where at least the first retransmission (e.g., ReTx 1) is scheduled to be sent. The Rx UE may also stay active till at least the extension for the ACK or NACK if enabled for more power saving. The Rx UE may continue monitoring SCI(s) from same or different Tx UE after switched to sending the ACK or NACK if enabled (e.g., via configuration). Thus, the SL Inactivity Timer or SL Retransmission Timer (e.g., "SL Inact Timer 3" or "SL Retran Timer 3") may be further reset or updated per the newly detected SCI from same or different Tx UE after Rx UE switches to send the ACK or NACK (e.g., NACK in slot N). In this case, the Rx UE may stay active after sending the ACK or NACK during the extended active state. In the case that a NACK is sent (e.g., in slot N), e.g., needing HARQ retransmission, the SL Inactivity Timer or SL Retransmission Timer (e.g., "SL Inact Timer 2" or "SL Retran Timer 2") may be further reset or updated at the first slot after the slot for reserved first retransmission (e.g., at slot 2N–1) per the first retransmission (e.g., ReTx1 on PSSCH 2) reserved by the first SCI (e.g., SCI 1) with the initial transmission (e.g., InitTx1 on PSSCH 1). The Rx UE may also monitor any SCI(s) from same or different Tx UE during this extension, if enabled.

As another example, a Rx UE may set an SL Inactivity Timer or SL Retransmission Timer based on if monitoring more SCI(s) from same or different Tx UE and/or the first retransmission (e.g., ReTx1 on PSSCH 2) to the initial transmission (e.g., Init Tx 1 on PSSCH 1) with the assumption that retransmission is needed or based on the PDB or remaining PDB (e.g., a configured value) for the data transmission. If the initial transmission is successfully decoded and monitoring other SCI(s) from same or different Tx UE is not needed, an RX UE may switch to low power mode for most power saving if enabled (e.g., via configuration or MAC command from Tx UE) after sending an ACK within or outside of the SL DRX on phase, or may switch to low power mode for power saving if enabled after SL DRX on phase expires if the ACK is sent within the SL DRX on phase. If monitoring other SCI(s) from same or different Tx UE is needed, the Rx UE may continue monitoring the other SCI(s) before the SL DRX on phase ends (if the ACK is sent within the SL DRX on phase) or before the extension ends (if the ACK is sent outside of the SL DRX on phase, e.g., "SL Inact Timer 2" or "SL Retran Timer 2" is still running or is not stopped after sending an ACK after the first retransmission ReTx1 with PSSCH2). As another example, if the initial transmission is not successfully decoded and the SL Inactivity Timer or SL Retransmission Timer is set (e.g., shown as "SL Inact Timer 1" or "SL Retran Timer 1") according to the time between the initial transmission (e.g., InitTx1 carried on PSSCH 1 in slot N–1) and at least a first HARQ retransmission (e.g., ReTx1 carried on PSSCH 2 during slot 2N–1, as reserved by SCI 1), e.g., the SL Inactivity Timer or SL Retransmission Timer is set at the first slot (e.g., slot N) after the slot receiving the first SCI (e.g., slot N–1) per the resource(s) reserved for the retransmission(s) by the first SCI to extend the active state to at least the end of the first HARQ retransmission or per the PDB or remaining PDB of the data, the Rx UE may switch to sending a negative acknowledgement (NACK) after failed decoding either within the SL DRX on phase or within the extension based on the NACK resource allocation, (e.g., to send a NACK in slot N within the extension). After the NACK is sent, the Rx UE may switch back to continue monitoring any resource reselected for the first HARQ retransmission and/or to continue monitoring any SCI(s) from same Tx or different Tx UE with a new transmission and its associated retransmission(s). In other words, the Rx UE may transmit a NACK indicating to the Tx UE that the initial transmission (e.g., in PSSCH 1) was not successfully received. In response to the NACK, the Tx UE may send the first retransmission at the resource reserved by the first SCI (e.g., in PSSCH 2 for the initial transmission in PSSCH 1, as illustrated) or at a resource reselected if the reserved resource is dropped due to channel congestion, priority, preemption or any other factor. If the first retransmission (e.g., ReTx1 on PSSCH 2) is not decoded successfully (e.g., the SCI of the reserved retransmission is not successfully decoded or the reserved retransmission is not transmitted due to preemption or priority dropping), the SL Inactivity Timer or SL Retransmission Timer (e.g., "SL Inact Timer 2" or "SL Retran Timer 2") may be further reset or updated till the end of the second reserved HARQ retransmission (not shown in FIG. 8C) indicated by the first SCI with the initial transmission (e.g., SCI 1) or the second SCI with the first HARQ retransmission (e.g., SCI2) or to the end of the PDB or remaining PDB of the data. The Rx UE may continue staying active during this extension for monitoring any resource reselection for the second HARQ retransmission and/or for monitoring any SCI(s) from same Tx or different Tx UE with a new transmission and its associated retransmission(s).

Further, the Rx UE may remain in an active state to check any possible resource reselected for the first HARQ retransmission originally reserved by the first SCI (e.g., ReTx1 carried on PSSCH 2 reserved by SCI 1) and rescheduled by a third SCI (e.g., ReTx3 carried on PSSCH 3 rescheduled by SCI 3) or any new transmission and its associated retransmissions from same or different Tx UE by a third SCI (e.g., InitTx2 carried on PSSCH 3 as scheduled by SCI 3) before the first HARQ retransmission originally reserved by the first SCI (e.g., ReTx1 on PSSCH2 reserved by SCI 1), if any. Additionally, if the Rx UE does receive the third scheduling SCI (e.g., SCI 3) prior to the first retransmission originally reserved by the first SCI (e.g., ReTx1 on PSSCH 2) where the third scheduling SCI for retransmission may implicitly indicate resource reselection due to preemption or dropping, the UE may reset or update the SL Inactivity Timer or SL Retransmission Timer (e.g., shown as "SL Inact Timer 3" or "SL Retran Timer 3") at the first slot (e.g., slot 2N−1) after the slot receiving the third scheduling SCI (e.g., SCI 3), based on the resource(s) as indicated by the newly received third scheduling SCI (e.g., SCI 3) for the second HARQ retransmission and/or the PDB or remaining PDB for the data transmission.

As also illustrated in FIG. 8C, an Rx UE may remain in an active state to check any possible resource reselected for the first HARQ retransmission originally reserved by the first SCI (e.g., ReTx1 carried on PSSCH 2 reserved by SCI 1) and rescheduled by a fourth SCI (e.g., ReTx4 carried on PSSCH 4 rescheduled by SCI 4) or any new transmission and its associated retransmissions from same or different Tx UE by a fourth SCI (e.g., InitTx2 carried on PSSCH 4 as scheduled by SCI 4) after the first HARQ retransmission originally reserved by the first SCI (e.g., ReTx1 on PSSCH2 reserved by SCI 1) is not detected (e.g., the SCI of the first reserved retransmission is not decoded successfully or the first retransmission is dropped due to channel congestion, priority, preemption or any other factor, if any). If the first retransmission is not detected (e.g., either SCI 2 or its associated ReTx1 on PSSCH 2 is not detected), the Rx UE may reset or update SL Inactivity Timer or SL Retransmission Timer (e.g., "SL Inact Timer 2" or "SL Retran Timer 2") at the first slot (e.g., slot 2N−1) after the slot reserved for the first retransmission, based on the resource reserved for a first retransmission (e.g., ReTx1 on PSSCH 2) as indicated by the first scheduling SCI (e.g., SCI 1) if any or based on the PDB or remaining PDB for the data transmission. The Rx UE may optionally switch to send a NACK at the resource for the first HARQ retransmission (e.g., ReTx1 on PSSCH 2) due to failed detection of the reserved first retransmission. The Rx UE may keep staying active to monitor resource reselection for the first HARQ retransmission or any new transmission and its associated retransmission(s) from same or different Tx UE. During the extension after failed detecting the first HARQ retransmission originally reserved by the first SCI (e.g., ReTx1 on PSSCH 2), if the Rx UE does receive a fourth scheduling SCI (e.g., SCI 4) before the second HARQ retransmission originally reserved by the first SCI (not shown in FIG. 8C), the UE may reset or update the SL Inactivity Timer or SL Retransmission Timer (e.g., shown as "SL Inact Timer 4" or "SL Retran Timer 4") based on the resource(s) as indicated by the newly received fourth scheduling SCI (e.g., SCI 4) and/or based on the PDB or remaining PDB for the data transmission, wherein the fourth scheduling SCI may indicates a resource reselection for the first retransmission (e.g., RxTx4 on PSSCH 4) or a new transmission and its associated retransmission(s) from same or different Tx UE. Otherwise, if no fourth SCI detected for reselection or new transmission, the Rx UE may stay active to detect the second retransmission originally reserved by the first SCI (not shown in FIG. 8C) within the extension (e.g., "SL Inact Timer 2" or "SL Retran Timer 2").

Figure 8D:
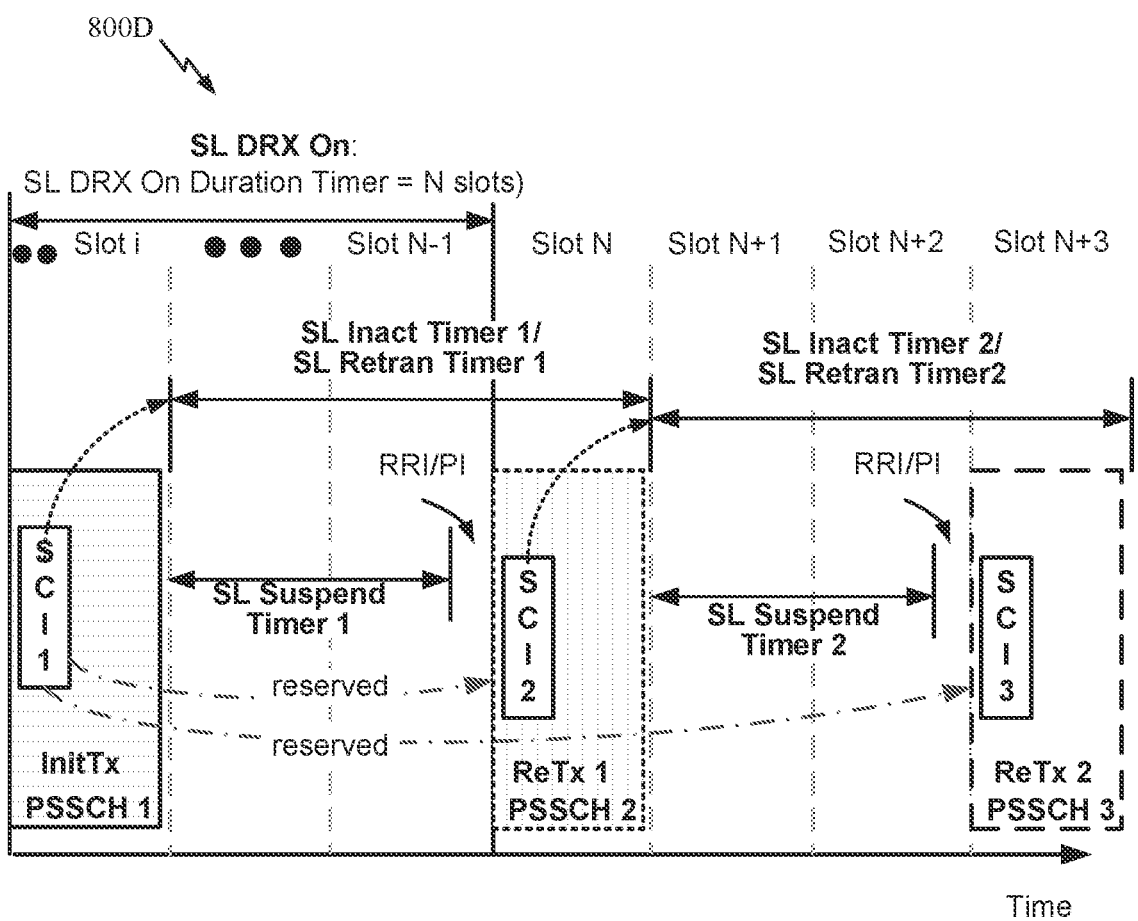

As illustrated in the implementation 800D of FIG. 8D, further power saving techniques may be provided by a Tx UE transmitting implicitly or explicitly a resource reselection indication (RRI) or by any UE (including the Tx UE) transmitting implicitly or explicitly a preemption indication (PI). In other words, a TX UE may transmit an RRI or any UE may transmit a PI to indicate that resources reserved for a transmission or retransmission (e.g., retransmission ReTx1 in PSSCH 2) have been dropped or preempted and the resource(s) for the transmission or retransmission need to be reselected with another resources (e.g., the implicit indication as described with respect to FIG. 8A). Therefore, the Rx UE may decide to skip the originally reserved transmission or retransmission (ReTx1 on PSSCH 2) and to skip monitoring other SCI(s) from same or different Tx UE for a new transmission and its associated retransmissions if enabled and hence reenter an inactive state if an RRI or PI is received to save more power.

In other words, as illustrated in FIG. 8D, the Rx UE may enter an inactive state to further save power between two transmissions as indicated by a scheduling SCI (e.g., the first SCI shown as SCI 1) if not monitoring any other SCI(s) from same or different Tx UE for a new transmission and its associated retransmissions. For example, an SL Suspend Timer may be set according to the time between the initial transmission (e.g., InitTx carried on PSSCH 1 in slot i) and the monitoring occasion(s) for implicit or explicit RRI or PI per RRI or PI configuration (e.g., the duration for SL Suspend Timer 1). A SL Suspend Timer may be a timer set by a UE to suspend an active state within an SL DRX on phase or within an extension via SL Inactivity Timer or SL Retransmission Timer, e.g., enter a temporary inactive state or micro sleep while SL DRX On Duration Timer or SL Inactivity Timer or SL Retransmission Timer is still running (e.g., SL Inact Timer 1 or SL Retran Timer 1 as shown), until SL Suspend Timer (e.g., "SL Suspend Timer 1") expires. The Rx UE may resume the active state (e.g., start SL Inactivity Timer or SL Retransmission Timer) for a (re) transmission after the SL Suspend Timer (e.g., "SL Suspend Timer 1") expires. For example, as shown, after the SL Suspend Timer expires (e.g., "SL Suspend Timer 1" expires in slot N−1), the Rx UE resumes to the active state to monitor for any implicit or explicit RRI or PI from the Tx UE or any UE respectively, if any. The Rx UE may stay in the active state for the first blind retransmission (e.g., ReTx1 carried on PSSCH 2 as reserved by SCI 1) if no RRI or PI is detected after the SL Suspend Timer expires. The Rx UE may reset or update the SL Inactivity Timer or SL Retransmission Timer based on reselected resource(s), if indicated in an RRI or PI detected (e.g., an implicit RRI or PI indicated by the SCI transmitted with a retransmission with reselected resource such as ReTx3 in FIG. 8A, ReTx4 in FIG. 8B, or ReTx 3 or ReTx4 in FIG. 8C), to monitor for the rescheduled first blind retransmission, otherwise Rx UE may reset or update the SL Inactivity Timer or SL Retransmission Timer based on the second blind retransmission (e.g., ReTx2 carried on PSSCH 3) as reserved by the first scheduling SCI (e.g., SCI 1) if the SL Inactivity Timer or SL Retransmission Timer is set per the retransmission reservation or based on the PDB or remaining PDB and the Rx UE may stay active to monitor for the first retransmission rescheduled until the SL Inactivity Timer or SL Retransmission Timer expires. This active state suspension process may start with the Rx UE returning to an inactive state after the SL Inactivity Timer or SL Retransmission Timer expires for the first retransmission originally reserved (e.g., ReTx1 on PSSCH 2) or rescheduled, after which the UE may set another SL suspend timer (e.g., SL Suspend Timer 2 as shown) and enter an inactive state until the SL suspend timer expires (e.g., in slot N+2), resume to active state (e.g., reset or start SL Inactivity Timer or SL Retransmission Timer) to monitor for an RRI or PI (e.g., in slot N+2), and monitor for the second retransmission (e.g., ReTx2 in PSSCH 3, as illustrated) if no RRI or PI is detected or monitor for the second retransmission rescheduled if an RRI or PI is detected.

Figure 8E:
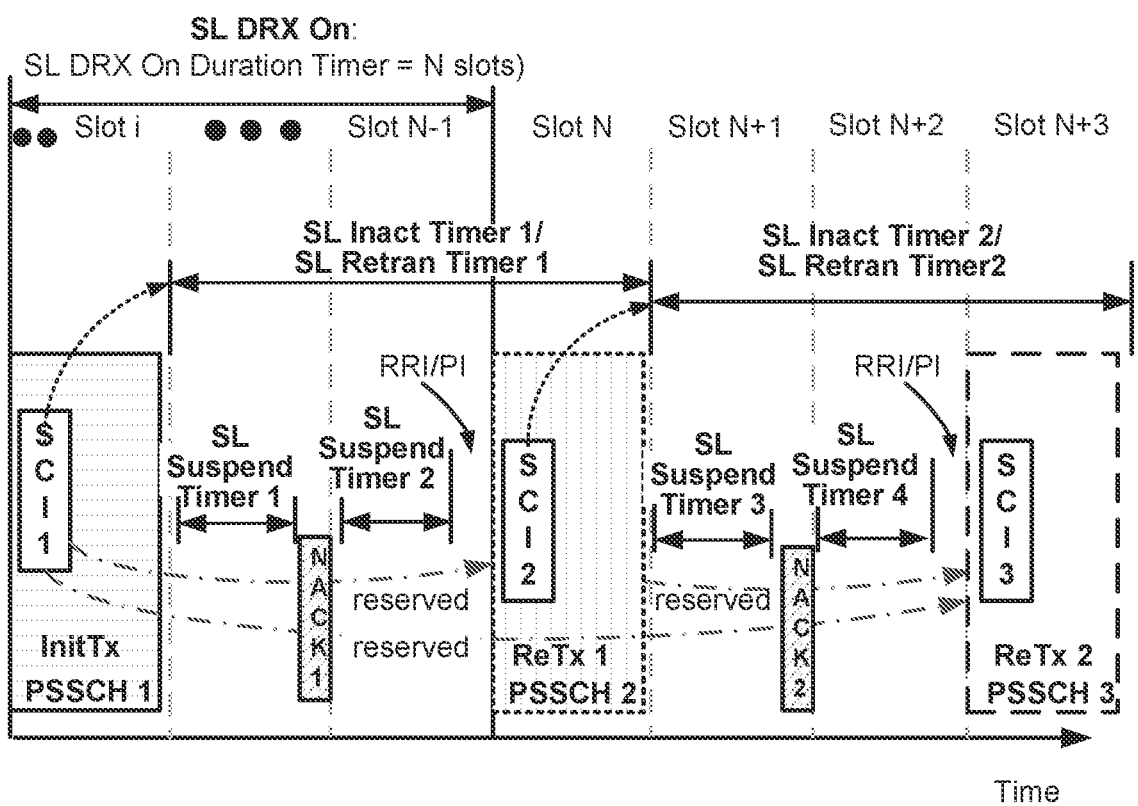

As illustrated in the implementation 800E of FIG. 8E, an Rx UE may enter an inactive state (e.g. micro sleep mode) before sending a HARQ feedback if the time gap from the end of decoding a transmission or retransmission to the beginning of a HARQ feedback transmission is large enough (e.g., enough time for switching from receiving to micro sleep and then from micro sleep to transmitting), and the Rx UE may also enter an inactive state after a HARQ feedback (e.g., NACK1 as shown) transmission (e.g., at the first symbol or slot after the HARQ feedback) if the time gap from the end of a HARQ feedback transmission to the beginning of RRI or PI or retransmission monitoring occasions is large enough (e.g., enough time for switching from transmitting to micro sleep and then from micro sleep to receiving). For example, SL Suspend Timer may be set according to the time gap (e.g., SL Suspend Timer 1) from the end of decoding the initial transmission (e.g., Init Tx on PSSCH 1) to the beginning of a first HARQ feedback (e.g., NACK1) and/or may be set according to the time gap (e.g., "SL Suspend Timer 2") from the end of the first HARQ feedback (e.g., slot N−1 after "NACK1") to the beginning of the first RRI or PI monitoring occasions (e.g., when "SL Suspend Timer 2 expires) during the SL DRX on phase or during the extension by SL Inactivity Timer or SL Retransmission Timer (e.g., shown as "SL Inact Timer 1" or "SL Retran Timer 1"). The Rx UE may then resume the active state for sending a HARQ feedback, monitoring RRI or PI or detecting a (re)transmission after the SL Suspend Timer expires. For example, after the first SL Suspend Timer (e.g., "SL Suspend Timer 1") expires before the first HARQ feedback, the Rx UE may resume the active state to send the first HARQ feedback (e.g., "NACK 1" for retransmission), and/or after the second SL Suspend Timer (e.g., "SL Suspend Timer 2") expires, the RX UE may resume the active state (e.g., starting or resetting SL Inactivity Timer or SL Retransmission Timer) in order to monitor for any RRI or PI or retransmission or transmission from the Tx UE or any other UE (e.g., in slot N−1). The Rx UE may stay at the active state to monitor for the first HARQ retransmission (e.g., ReTx1 carried on PSSCH 2) as reserved by the first scheduling SCI (e.g., by SCI 1), if no RRI or PI is detected, with the SL Inactivity Timer or SL Retransmission Timer reset according for the first HARQ retransmission as reserved by the first scheduling SCI. As shown, SL Suspend Timer may be set again according to the time gap (e.g., SL Suspend Timer 3) from the end of first retransmission to the second HARQ feedback (e.g., NACK2 transmission in slot N+1) and/or the time gap (e.g., SL Suspend Timer 4) from the end of the second HARQ feedback to the second RRI or PI or retransmission monitoring occasion for the second HARQ retransmission (e.g., ReTx2 carried on PSSCH 2) as reserved by the first scheduling SCI (e.g., SCI 1) or second scheduling SCI (e.g., SCI2) if the second HARQ feedback is a NACK.

Figure 8F:
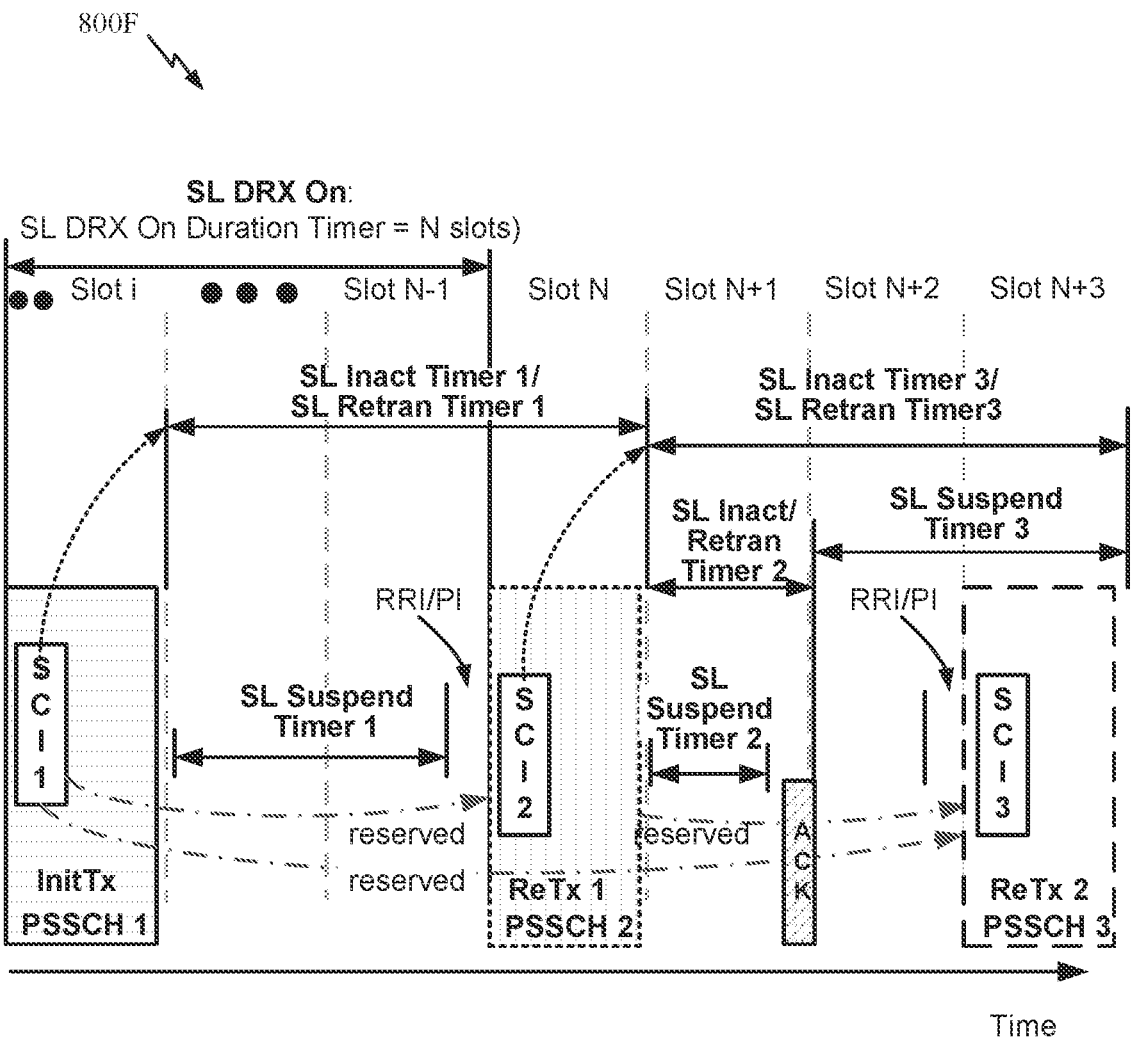

As illustrated in the implementation 800F of FIG. 8F, further power savings may also apply to mixed blind and HARQ retransmission scenario. For example, the Rx UE may set the SL Suspend Timer according to the time gap (e.g., "SL Suspend Timer 1") between the initial transmission (e.g., InitTx carried on PSSCH1 in slot i) and first RRI or PI or retransmission monitoring occasion for the blind retransmission (e.g., ReTx1 carried on PSSCH 2) as reserved by the first scheduling SCI (e.g., SCI 1), and may resume the active state for a (re)transmission after the SL Suspend Timer (e.g., "SL Suspend Timer 1") expires (e.g., starting or resetting "SL Inact Timer 1" or "SL Retran Timer 1") during the SL DRX on phase or the extension via SL Inactivity Timer or SL Retransmission Timer (e.g., the first activation of "SL Inact Timer 1" or "SL Retran Timer 1" as shown in FIG. 8F). After the SL Suspend Timer (e.g., "SL Suspend Timer 1") expires, the Rx UE may transition to an active state (e.g., starting or resetting SL Inactivity Timer or SL Retransmission Timer) to monitor for any RRI or PI or rertransmission, and maintain the active state for the first HARQ retransmission originally reserved (e.g., ReTx1 carried on PSSCH 2 as indicated by SCI 1) with the SL Inactivity Timer or SL Retransmission Timer set according to the original first HARQ retransmission (e.g., "SL Inact Timer 1" or "51 Retran Timer 1") if no RRI or PI detected or the first HARQ retransmission rescheduled with the SL Inactivity Timer or SL Retransmission Timer reset or updated according to the new scheduling SCI. Then the Rx UE may extend the active state (e.g., "SL Inact Timer 2"/ "Retran Timer 2" as shown) based on the HARQ feedback for the first retransmission (e.g., ACK in slot N+1) with a micro sleep (e.g., "SL Suspend 2") inserted before the HARQ feedback (e.g., ACK in slot N+1), or the Rx UE may extend the active state (e.g., "SL Inact Timer 3" or "SL Retran Timer 3" as shown) based on the second retransmission reserved by the first scheduling SCI (SCI 1) or the second scheduling SCI (e.g., SCI2) or the new rescheduling SCI for reselected resource with a micro sleep (e.g., "SL Suspend 2") inserted before the HARQ feedback (e.g., ACK) and another micro sleep (e.g., SL Suspend Timer 3) inserted after the ACK feedback to skip RRI or PI monitoring and the second retransmission monitoring for more power saving.

As shown in FIG. 8D, 8E and 8F, the RRI or PI may be explicitly indicated at a monitoring occasion prior to a transmission or retransmission to be dropped or preempted. The RRI or PI may also be explicitly or implicitly indicated at a monitoring occasion at the beginning of or after a transmission or retransmission dropped or preempted. For example, if the second SCI (e.g., SCI2 as shown in FIG. 8D, 8E and 8F) carries different source ID and/or destination ID, then the transmission is not the retransmission reserved for the Rx UE or a new SCI detected for retransmission (e.g., SCI4 in FIG. 8A as described for implicit indication), and thus it's an implicit RRI or PI indication. In this case the SL Suspend Timer may be set per the time gap from the end of a transmission or retransmission (e.g., the first slot after the slot receiving the SCI with the transmission or retransmission) to the beginning of the next transmission or retransmission (e.g. the first slot for the next transmission or retransmission) for transmissions without retransmissions or for transmissions with blind retransmissions, or the SL Suspend Timer may be set per the time gap from the end of a HARQ feedback transmission (e.g., the first symbol or slot after the HARQ feedback) to the beginning of the next retransmission for transmissions with HARQ feedback retransmissions, i.e. the Rx UE may stay inactive till the coming retransmission scheduled. The RRI or PI or retransmission monitoring occasion starts when the SL Suspend Timer (e.g., "SL Suspend Timer 2" or "SL Suspend Timer 4" in FIG. 8E) expires.

For groupcast, there may be two types of HARQ feedback retransmission scheme, e.g., NACK only from at least one Rx UE as type 1 and ACK or NACK feedback from all Rx UEs as type 2. For type 1, an Rx UE may extend the active state only for NACK only retransmissions with the mechanisms afore mentioned. For type 2, an Rx UE may skip monitoring a retransmission of a transmission that has been ACKed by the Rx UE already with the mechanisms afore mentioned if enabled for more power saving (e.g., via configuration or MAC command from Tx UE).

Figure 9:
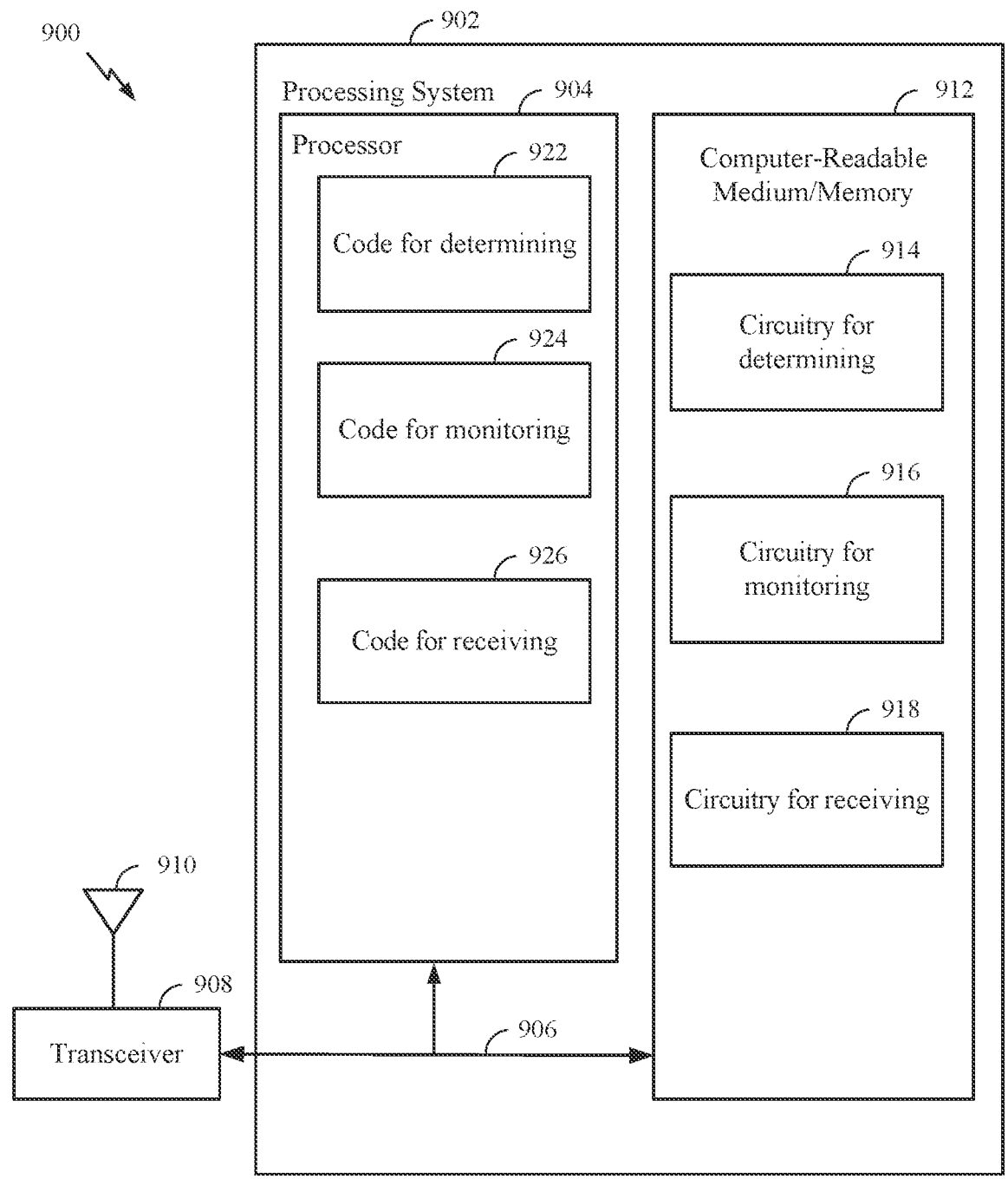
FIG. 9 illustrates a communications device that may include various components configured to perform operations for the techniques disclosed herein.

FIG. 9 illustrates a communications device 900 that may include various components (e.g., corresponding to means-plus-function components) configured to perform operations for the techniques disclosed herein, such as the operations illustrated in FIG. 5. The communications device 900 includes a processing system 902 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 5. In certain aspects, computer-readable medium/memory 912 stores code 914 for determining; code 916 for monitoring; and code 918 for receiving. In certain aspects, the processor 904 has circuitry configured to implement the code stored in the computer-readable medium/memory 912. The processor 904 includes circuitry 922 for determining; circuitry 924 for monitoring; and circuitry 926 for receiving.

Figure 10:
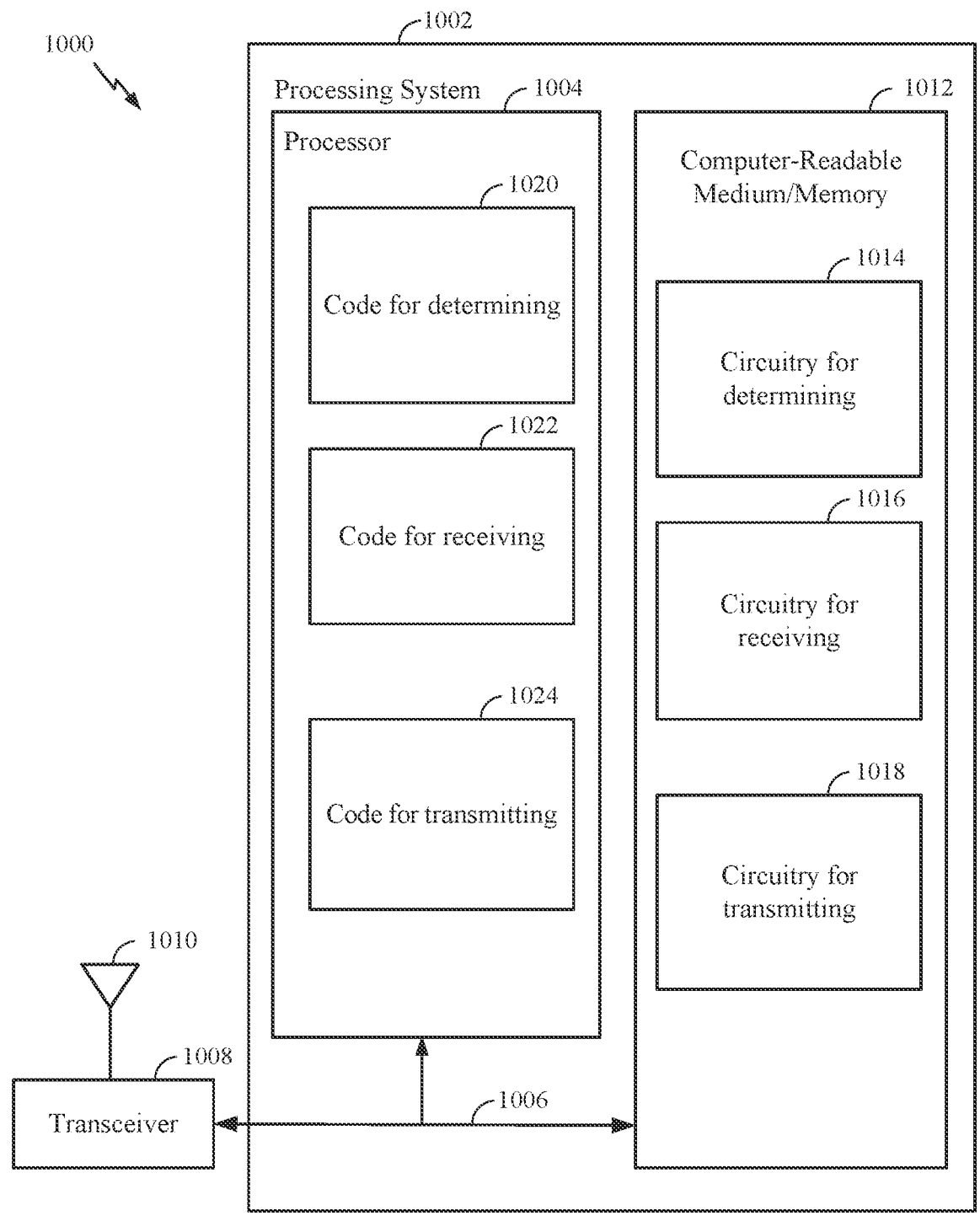
FIG. 10 illustrates a communications device that may include various components configured to perform operations for the techniques disclosed herein.

FIG. 10 illustrates a communications device 1000 that may include various components (e.g., corresponding to means-plus-function components) configured to perform operations for the techniques disclosed herein, such as the operations illustrated in FIG. 6. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 6. In certain aspects, computer-readable medium/memory 1012 stores code 1014 for determining; code 1016 for receiving; and code 1018 for transmitting. In certain aspects, the processor 1004 has circuitry configured to implement the code stored in the computer-readable medium/memory 1012. The processor 1004 includes circuitry 1020 for determining; circuitry 1022 for receiving; and circuitry 1024 for transmitting.

Example Clauses

Implementation examples are described in the following numbered clauses:

Clause 1. A method for wireless communication by a user equipment (UE), comprising: determining a configuration associated with sidelink for at least one communication; monitoring for at least one sidelink control information (SCI) after entering a sidelink DRX on phase based on the configuration; receiving, from one or more other UEs, the at least one SCI during the sidelink DRX on phase for at least one communication; and determining an extension to the sidelink DRX on phase based on the at least one SCI scheduling at least one resource for one or more transmissions.

Clause 2. The method of clause 1, wherein the configuration associated with sidelink comprises at least a DRX configuration or a DRX wake-up indication configuration.

Clause 3. The method of any one of clauses 1-2, wherein determining the extension to sidelink DRX on phase comprises determining to stay at an active state based on the at least one SCI scheduling the at least one resource for the one or more transmissions.

Clause 4. The method of any one of clauses 1-3, further comprising receiving the one or more transmissions during the extension of the sidelink DRX on phase.

Clause 5. The method of any one of clauses 1-4, further comprising: receiving another SCI scheduling the at least one resource for one or more transmissions during the extension of the sidelink DRX on phase; and determining another extension to the sidelink DRX on phase based on the received other SCI.

Clause 6. The method of any one of clauses 1-5, wherein the at least one SCI schedules the one or more transmissions across multiple slots, at least one of the multiple slots being during the sidelink DRX on phase.

Clause 7. The method of any one of clauses 1-6, wherein the one or more transmissions scheduled by the at least one SCI comprises at least a retransmission of a first transmission sent during the sidelink DRX on phase.

Clause 8. The method of clause 7, wherein: the method further comprises receiving the first transmission during the sidelink DRX on phase, the first transmission being transmitted with the at least one SCI; and determining the extension to the sidelink DRX on phase comprises determining to extend the sidelink DRX on phase if the first transmission is not successful.

Clause 9. The method of clause 8, further comprising monitoring for another SCI prior to reception occasion of the retransmission reserved by the at least one SCI, wherein the other SCI indicates an adjustment to allocated resources for the retransmission reserved by the at least one SCI.

Clause 10. The method of any one of clauses 8-9, further comprising monitoring for another SCI prior to reception occasion of the retransmission reserved by the at least one SCI, wherein the other SCI is transmitted with a second transmission, the other SCI indicating a resource allocated for a retransmission of the second transmission.

Clause 11. The method of any one of clauses 8-10, further comprising monitoring for another SCI after reception occasion of the retransmission reserved by the at least one SCI, wherein the other SCI indicates an adjustment to allocated resources for the retransmission reserved by the at least one SCI.

Clause 12. The method of any one of clauses 8-11, further comprising monitoring for another SCI after reception occasion of the retransmission reserved by the at least one SCI, wherein the other SCI is transmitted with a second transmission, the other SCI indicating a resource allocated for a retransmission of the second transmission.

Clause 13. The method of any one of clauses 1-12, further comprising: receiving a first transmission during the sidelink DRX on phase, the first transmission being transmitted with the at least one SCI; and transmitting a feedback signal indicating whether the first transmission is successfully received, the determination of the extension being based on the feedback signal.

Clause 14. The method of clause 13, wherein the feedback signal is a negative acknowledgment (NACK).

Clause 15. The method of any one of clauses 13-14, wherein the feedback signal is a positive acknowledgment (ACK).

Clause 16. The method of any one of clauses 1-15, wherein: the method further comprises receiving a first transmission during the sidelink DRX on phase, the first transmission being transmitted with the at least one SCI; the at least one SCI schedules the at least one resource for a second transmission within or after the sidelink DRX on phase; and the determination to extend the sidelink DRX on phase comprises deciding to stay at an active state at least until the end of the second transmission.

Clause 17. The method of clause 16, wherein the first transmission comprises an initial transmission.

Clause 18. The method of clause 17, wherein the second transmission comprises a retransmission of the initial transmission.

Clause 19. The method of clause 18, wherein the retransmission comprises a blind retransmission, a hybrid automatic repeat request (HARQ) retransmission, or both.

Clause 20. The method of any one of clauses 16-19, wherein the second transmission comprises different data than the first transmission.

Clause 21. The method of any one of clauses 1-20, further comprising: receiving a first transmission during the sidelink DRX on phase, the first transmission being transmitted with the at least one SCI; and determining to stay at an active state after reception of the first transmission to monitor for a retransmission of the first transmission or a second transmission.

Clause 22. The method of any one of clauses 1-21, wherein: the method further comprises receiving a first transmission during the sidelink DRX on phase, the first transmission being transmitted with the at least one SCI; and determining the extension to the sidelink DRX on phase comprises: determining to enter an inactive state after reception of the first transmission; and determining to exit the inactive state to monitor for a retransmission of the first transmission.

Clause 23: The method of one of clauses 1-22, wherein: the method further comprises receiving a first transmission during the sidelink DRX on phase, the first transmission being transmitted with the at least one SCI; and determining the extension to sidelink DRX on phase comprises: determining to enter an inactive state after transmission of feedback for the first transmission; and determining to exit the inactive state to monitor for a retransmission of the first transmission.

Clause 24. The method of clause 23, further comprising transmitting the feedback, wherein the transmission of the feedback comprises a transmission of a NACK indicating that the first transmission was not successfully received.

Clause 25. The method of any one of clauses 23-24, wherein: determining the extension to sidelink DRX on phase further comprises determining to extend the sidelink DRX on phase based on the at least one SCI scheduling the at least one resource for the retransmission of the first transmission; the method further comprises transmitting a NACK indicating that the first transmission was not successfully received during an extended portion of the sidelink DRX on phase; and entering the inactive state comprises entering the inactive state at the end of the transmission of the NACK.

Clause 26. A method for wireless communication by a user equipment (UE), comprising: determining a configuration associated with sidelink for at least one communication; determining an extension to a sidelink DRX on phase associated with the configuration based on whether at least one sidelink control information (SCI) schedules at least one resource for one or more transmissions; and transmitting the at least one SCI during the sidelink DRX on phase to at least one other UE for at least one communication.

Clause 27. The method of clause 26, further comprising transmitting a wake-up indication prior to the sidelink DRX on phase.

Clause 28. The method of any one of clauses 26-27, wherein the configuration associated with sidelink comprises at least a DRX configuration or a DRX wake-up indication configuration.

Clause 29. The method of any one of clauses 26-28, wherein determining the extension to sidelink DRX on phase comprises -determining to stay at an active state based on the at least one SCI scheduling the at least one first resource for the one or more transmissions.

Clause 30. The method of any one of clauses 26-29, further comprising transmitting the one or more transmissions during the extension of the sidelink DRX on phase.

Clause 31. The method of clause 30, further comprising: transmitting another SCI scheduling the at least one resource for one or more transmissions during the extension of the sidelink DRX on phase; and determining another extension to the sidelink DRX on phase based on the other SCI.

Clause 32. The method of any one of clauses 26-31, wherein the at least one SCI schedules the one or more transmissions across multiple slots, at least one of the multiple slots being during the sidelink DRX on phase.

Clause 33. The method of any one of clauses 26-32, wherein the one or more transmissions scheduled by the at least one SCI comprises at least a retransmission of a first transmission sent during the sidelink DRX on phase.

Clause 34. The method of clause 33, wherein: the method further comprises transmitting the first transmission during the sidelink DRX on phase, the first transmission being transmitted with the at least one SCI; and determining the extension to the sidelink DRX on phase comprises determining to extend the sidelink DRX on phase if the first transmission is not successful.

Clause 35. The method of clause 34, further comprising transmitting another SCI prior to the retransmission, wherein the other SCI indicates an adjustment to allocated resources for the retransmission.

Clause 36. The method of any one of clauses 34-25, further comprising transmitting another SCI prior to the retransmission reserved by the at least one SCI, wherein the other SCI is transmitted with a second transmission, the other SCI indicating a resource allocated for a retransmission of the second transmission reserved by the at least one SCI.

Clause 37. The method of any one of clauses 34-36, further comprising transmitting another SCI after the retransmission reserved by the at least one SCI, wherein the other SCI indicates an adjustment to allocated resources for the retransmission.

Clause 38. The method of any one of clauses 34-36, further comprising transmitting another SCI after the retransmission reserved by the at least one SCI, wherein the other SCI is transmitted with a second transmission, the other SCI indicating a resource allocated for a retransmission of the second transmission.

Clause 39. The method of any one of clauses 26-38, further comprises: transmitting a first transmission during the sidelink DRX on phase, the first transmission being transmitted with the at least one SCI; and receiving a feedback signal indicating whether the first transmission is successfully received, the determination of the extension being based on a resource allocation for the feedback signal.

Clause 40. The method of clause 39, wherein the feedback signal is a negative acknowledgment (NACK).

Clause 41. The method of any one of clauses 39-40, wherein the feedback signal is a positive acknowledgment (ACK).

Clause 42. The method of any one of clauses 26-41, wherein: the method further comprises transmitting a first transmission during the sidelink DRX on phase, the first transmission being transmitted with the at least one SCI; the at least one SCI schedules the at least one resource for a second transmission within or after the sidelink DRX on phase; and the determination to extend the sidelink DRX on phase comprises deciding to stay at an active state until the end of the second transmission.

Clause 43. The method of clause 42, wherein the first transmission comprises an initial transmission.

Clause 44. The method of clause 43, wherein the second transmission comprises a retransmission of the initial transmission.

Clause 45. The method of clause 44, wherein the retransmission comprises a blind retransmission, a hybrid automatic repeat request (HARQ) retransmission, or both.

Clause 46. The method of any one of clauses 42-45, wherein the second transmission comprises different data than the first transmission.

Clause 47. The method of any one of clauses 42-46, further comprising receiving a negative acknowledgment (NACK) indicating that the first transmission was not successfully received, the determination to extend the sidelink DRX on phase being due to the transmission of the NACK.

Clause 48. The method of any one of clauses 26-47, further comprising: transmitting a first transmission during the sidelink DRX on phase, the first transmission being transmitted with the at least one SCI; and determining to stay at an active state after the transmission of the first transmission to send a retransmission of the first transmission or a second transmission.

Clause 49. The method of any one of clauses 26-48, wherein: the method further comprises transmitting a first transmission during the sidelink DRX on phase, the first transmission being transmitted with the at least one SCI; and determining the extension to the sidelink DRX on phase comprises: determining to enter an inactive state after transmission of the first transmission; and determining to exit the inactive state to transmit a retransmission of the first transmission.

Clause 50: The method of one of clauses 26-49, wherein: the method further comprises transmitting a first transmission during the sidelink DRX on phase, the first transmission being transmitted with the at least one SCI; and determining the extension to sidelink DRX on phase comprises: determining to enter an inactive state after reception of feedback for the first transmission; and determining to exit the inactive state to transmit a retransmission of the first transmission.

Clause 51. The method of clause 50, further comprising receiving the feedback, wherein the reception of the feedback comprises a reception of a NACK indicating that the first transmission was not successfully received.

Clause 52. The method of any one of clauses 50-51, wherein: determining the extension to sidelink DRX on phase further comprises determining to extend the sidelink DRX on phase based on the at least one SCI scheduling the at least one resource for the retransmission of the first transmission; the method further comprises receiving a NACK indicating that the first transmission was not successfully received during an extended portion of the sidelink DRX on phase; and entering the inactive state comprises entering the inactive state at the end of the reception of the NACK.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer- readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/ or encoded) thereon, the instructions being executable by one or more processors to perform the operations described herein, for example, instructions for performing the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:
   determining a configuration associated with sidelink for at least one communication;
   monitoring for at least one sidelink control information (SCI) after entering a sidelink discontinuous reception (DRX) on phase based on the configuration;
   receiving, from one or more other UEs, the at least one SCI during the sidelink DRX on phase for at least one communication;
   determining an extension to the sidelink DRX on phase based on the at least one SCI scheduling at least one resource for one or more transmissions; and
   monitoring for an other SCI prior to a reception occasion of a retransmission reserved by the at least one SCI, wherein the other SCI indicates an adjustment to allocated resources for the retransmission and the retransmission comprises a retransmission of a first transmission of the one or more transmissions if the first transmission is not successful.

2. The method of claim 1, wherein the configuration associated with sidelink comprises at least a DRX configuration or a DRX wake-up indication configuration.

3. The method of claim 1, wherein determining the extension to the sidelink DRX on phase comprises determining to stay at an active state based on the at least one SCI scheduling the at least one resource for the one or more transmissions.

4. The method of claim 1, further comprising receiving the one or more transmissions during the extension of the sidelink DRX on phase.

5. The method of claim 1, further comprising:
   receiving another SCI scheduling the at least one resource for one or more transmissions during the extension of the sidelink DRX on phase; and
   determining another extension to the sidelink DRX on phase based on the received other SCI.

6. The method of claim 1, wherein the at least one SCI schedules the one or more transmissions across multiple slots, at least one of the multiple slots being during the sidelink DRX on phase.

7. The method of claim 1, wherein:
   the method further comprises receiving the first transmission during the sidelink DRX on phase, the first transmission being transmitted with the at least one SCI; and
   determining the extension to the sidelink DRX on phase comprises determining to extend the sidelink DRX on phase if the first transmission is not successful.

8. The method of claim 7, further comprising monitoring for another SCI prior to reception occasion of the retransmission reserved by the at least one SCI, wherein the other SCI is transmitted with a second transmission, the other SCI indicating a resource allocated for a retransmission of the second transmission.

9. The method of claim 7, further comprising monitoring for another SCI after reception occasion of the retransmission reserved by the at least one SCI, wherein the other SCI indicates an adjustment to allocated resources for the retransmission reserved by the at least one SCI.

10. The method of claim 7, further comprising monitoring for another SCI after reception occasion of the retransmission reserved by the at least one SCI, wherein the other SCI is transmitted with a second transmission, the other SCI indicating a resource allocated for a retransmission of the second transmission.

11. The method of claim 1, further comprising:
   receiving the first transmission during the sidelink DRX on phase, the first transmission being transmitted with the at least one SCI; and
   transmitting a feedback signal indicating whether the first transmission is successfully received, the determination of the extension being based on the feedback signal.

12. The method of claim 11, wherein the feedback signal is a negative acknowledgment (NACK).

13. The method of claim 11, wherein the feedback signal is a positive acknowledgment (ACK).

14. The method of claim 1, wherein:
   the method further comprises receiving the first transmission during the sidelink DRX on phase, the first transmission being transmitted with the at least one SCI;

the at least one SCI schedules the at least one resource for a second transmission within or after the sidelink DRX on phase; and
the determination to extend the sidelink DRX on phase comprises deciding to stay at an active state at least until the end of the second transmission.

15. The method of claim 14, wherein the first transmission comprises an initial transmission.

16. The method of claim 15, wherein the second transmission comprises a retransmission of the initial transmission.

17. The method of claim 16, wherein the retransmission comprises a blind retransmission, a hybrid automatic repeat request (HARQ) retransmission, or both.

18. The method of claim 14, wherein the second transmission comprises different data than the first transmission.

19. The method of claim 1, further comprising:
receiving a first transmission during the sidelink DRX on phase, the first transmission being transmitted with the at least one SCI; and
determining to stay at an active state after reception of the first transmission to monitor for a retransmission of the first transmission or a second transmission.

20. The method of claim 1, wherein:
the method further comprises receiving the first transmission during the sidelink DRX on phase, the first transmission being transmitted with the at least one SCI; and
determining the extension to the sidelink DRX on phase comprises:
determining to enter an inactive state after reception of the first transmission; and
determining to exit the inactive state to monitor for a retransmission of the first transmission.

21. The method of claim 1, wherein:
the method further comprises receiving the first transmission during the sidelink DRX on phase, the first transmission being transmitted with the at least one SCI; and
determining the extension to the sidelink DRX on phase comprises:
determining to enter an inactive state after transmission of feedback for the first transmission; and
determining to exit the inactive state to monitor for a retransmission of the first transmission.

22. The method of claim 21, further comprising transmitting the feedback, wherein the transmission of the feedback comprises a transmission of a NACK indicating that the first transmission was not successfully received.

23. The method of claim 21, wherein:
determining the extension to the sidelink DRX on phase further comprises determining to extend the sidelink DRX on phase based on the at least one SCI scheduling the at least one resource for the retransmission of the first transmission;
the method further comprises transmitting a NACK indicating that the first transmission was not successfully received during an extended portion of the sidelink DRX on phase; and
entering the inactive state comprises entering the inactive state at the end of the transmission of the NACK.

24. A method for wireless communication by a user equipment (UE), comprising:
determining a configuration associated with sidelink for at least one communication;
determining an extension to a sidelink discontinuous reception (DRX) on phase associated with the configuration based on whether at least one sidelink control information (SCI) schedules at least one resource for one or more transmissions of the at least one communication;
transmitting the at least one SCI during the sidelink DRX on phase to at least one other UE for a first transmission of the one or more transmissions; and
determining an other SCI prior to transmission occasion of a retransmission reserved by the at least one SCI, wherein the other SCI indicates an adjustment to allocated resources for the retransmission and wherein the retransmission comprises a retransmission of the first of the one or more transmissions if the first transmission is not successful.

25. The method of claim 24, wherein determining the extension to the sidelink DRX on phase comprises determining to stay at an active state based on whether the at least one SCI schedules the at least one resource for the one or more transmissions after the sidelink DRX on phase.

26. The method of claim 24, further comprising transmitting the one or more transmissions during the extension of the sidelink DRX on phase.

27. An apparatus for wireless communication by a user equipment (UE), comprising:
a memory; and
one or more processors coupled to the memory, the memory and the one or more processors being configured to:
determine a configuration associated with sidelink for at least one communication;
monitor for at least one sidelink control information (SCI) after entering a sidelink discontinuous reception (DRX) on phase based on the configuration;
receive, from one or more other UEs, the at least one SCI during the sidelink DRX on phase for at least one communication;
determine an extension to the sidelink DRX on phase based on the at least one SCI scheduling at least one resource for one or more transmissions; and
monitoring for an other SCI prior to reception occasion of a retransmission reserved by the at least one SCI, wherein the other SCI indicates an adjustment to allocated resources for the retransmission and the retransmission comprises a retransmission of a first transmission of the one or more transmissions if the first transmission is not successful.

28. An apparatus for wireless communication by a user equipment (UE), comprising:
a memory; and
one or more processors coupled to the memory, the memory and the one or more processors being configured to:
determine a configuration associated with sidelink for at least one communication;
determine an extension to a sidelink discontinuous reception (DRX) on phase associated with the configuration based on at least one sidelink control information (SCI) scheduling at least one resource for one or more transmissions after the sidelink DRX on phase for at least one communication;
transmit the at least one SCI during the sidelink DRX on phase to at least one other UE for at least one communication; and
transmit the at least one SCI during the sidelink DRX on phase to at least one other UE for a first transmission of the one or more transmissions; and
determining an other SCI prior to transmission occasion of a retransmission reserved by the at least one SCI, wherein the other SCI indicates an adjustment to allocated resources for the retransmission and wherein the retransmission comprises a retransmission of the first of the one or more transmissions if the first transmission is not successful.

* * * * *